US006809742B1

(12) United States Patent
Motosugi et al.

(10) Patent No.: US 6,809,742 B1
(45) Date of Patent: Oct. 26, 2004

(54) IMAGE EDITING DEVICE PERMITTING USER TO REGISTER DESIRED PATTERNS

(75) Inventors: Toshihisa Motosugi, Okazaki (JP); Hiroyuki Ideyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 935 days.

(21) Appl. No.: 08/897,440

(22) Filed: Jul. 21, 1997

(30) Foreign Application Priority Data

Jul. 29, 1996 (JP) .............................. 8-199137

(51) Int. Cl.[7] .............................................. G09G 5/00
(52) U.S. Cl. ....................... 345/619; 345/620; 345/625; 345/632; 345/641; 358/452; 358/537; 358/538
(58) Field of Search ................. 345/112–116, 118–121, 345/127, 129–130, 619, 620, 625, 632, 641; 358/448, 515, 523, 527, 528, 451–452

(56) References Cited

U.S. PATENT DOCUMENTS

| | | | | |
|---|---|---|---|---|
| 4,958,301 A | * | 9/1990 | Kobayashi .................. 364/521 |
| 5,142,355 A | | 8/1992 | Fujima ....................... 358/515 |
| 5,459,832 A | * | 10/1995 | Wolf et al. .................. 345/342 |
| 5,659,398 A | * | 8/1997 | Koyama et al. ............. 358/296 |
| 5,694,486 A | * | 12/1997 | Shigeeda et al. ............ 382/197 |
| 5,712,713 A | * | 1/1998 | Hamanaka et al. ......... 358/451 |
| 5,721,959 A | * | 2/1998 | Nakamura et al. ......... 395/919 |

FOREIGN PATENT DOCUMENTS

| | | |
|---|---|---|
| JP | 59-095536 | 6/1984 |
| JP | 63-223785 | 9/1988 |
| JP | 05094311 | 10/1991 |
| JP | 04-213769 | 8/1992 |
| JP | 5-72709 | 3/1993 |
| JP | 5-290142 | 11/1993 |
| JP | 6-95393 | 4/1994 |

* cited by examiner

Primary Examiner—Richard Hjerpe
Assistant Examiner—Henry N. Tran
(74) Attorney, Agent, or Firm—McDermott Will & Emery LLP

(57) ABSTRACT

An image editing apparatus capable of accurately registering a texture pattern from a document has the following configuration. The image data of a read document is displayed on a liquid crystal display. A user designates a point C therein and designates a range P2 for incorporating texture pattern around the point. The user also designates the size and range of the texture pattern used for displaying the texture using cursors S and E so that the texture patterns can be displayed smoothly connected when displayed serially in the vertical and horizontal direction.

34 Claims, 43 Drawing Sheets

FIG. 7

| MEMORY | MEMORY PLANE | BLACK-AND-WHITE DOCUMENT | COLOR DOCUMENT | BLACK-AND-WHITE + COLOR DOCUMENT |
|---|---|---|---|---|
| EDITING AREA DESIGNATION MEMORY 626 | BIT 15 | 1ST-15TH CHARACTERS/ BASE PROCESSING AREA CODES<br><br>* 1ST-15TH CHARACTERS/ BASE PROCESSING AREAS ARE ALLOCATED TO BITS 15-1 | 1ST-6TH CHARACTERS/ BASE PROCESSING AREA CODES<br><br>* 1ST-6TH CHARACTERS/BASE PROCESSING AREAS ARE ALLOCATED TO BITS 15-10 | 1ST-14TH FOR FIT IN COMBINATION<br><br>·CHARACTER COMBINED-BLACK-AND-WHITE DOCUMENT WINDOW FOR EDITING DESIGNATED AREA CODE<br><br>* 1ST-14TH FIT IN COMBINED/ CHARACTER COMBINED-BLACK-AND-WHITE DOCUMENT EDITING-WINDOW DESIGNATION AREA IS ALLOCATED TO BITS 15-2 |
| | BIT 14 | | | |
| | BIT 13 | | | |
| | BIT 12 | | | |
| | BIT 11 | | | |
| | BIT 10 | | | |
| | BIT 9 | | 1ST-4TH COLOR CHANGE AREA CODES<br><br>* 1ST-4TH COLOR CHANGE AREAS ARE ALLOCATED TO BITS 9-6 | |
| | BIT 8 | | | |
| | BIT 7 | | | |
| | BIT 6 | | | |
| | BIT 5 | | 1ST-3RD MONOCHROME AREA CODES<br><br>* 1ST-3RD MONOCHROME AREAS ARE ALLOCATED TO BITS 5-3 | |
| | BIT 4 | | | |
| | BIT 3 | | | |
| | BIT 2 | | PATTERNING AREA CODE | |
| | BIT 1 | | NEGATIVE/POSITIVE REVERSING AREA CODE | IMAGE COMBINING DESIGNATION AREAS<br><br>0: OVERLAP COMBINATION<br>1: FIT IN/CHARACTER COMBINATION-<br>2: IMAGE ERASING<br>3: NON-SELECTED (SCANNER IMAGE) |
| | BIT 0 | ERASE AREA CODE | ← | |

MEMORY FOR DISPLAY

AREA DESIGNATION MEMORY

| MEMORY | MEMORY PLANE | BLACK-AND-WHITE DOCUMENT | COLOR DOCUMENT | BLACK-AND-WHITE + COLOR DOCUMENT |
|---|---|---|---|---|
| CLOSED LOOP·MARKER DETECTION/ LCD DISPLAY DOCUMENT MEMORY | BIT 7 | BLACK-AND-WHITE GRADATION DATA FOR DISPLAY | LCD DISPLAY CODES | LCD DISPLAY CODES |
| | BIT 6 | | | |
| | BIT 5 | | | |
| | BIT 4 | | | |
| | BIT 3 | MARKER COLOR CODES 0:NON 1:R 2:G 3:B 4:C 5:M 6:Y | | |
| | BIT 2 | | | |
| | BIT 1 | | | |
| | BIT 0 | BLACK-AND-WHITE BINARIZED DATA | | |

AREA DESIGNATION TOOL

AREA SELECTION BUTTON — ENTIRE AREA BUTTON
BOX BUTTON — R BOX BUTTON
TRACE BUTTON — CLOSED LOOP BUTTON
STRAIGHT LINE BUTTON — FREE SHAPE BUTTON

MARKER AREA DESIGNATION TOOL

EDITING TEXTURE PATTERNS

◇ READING DOCUMENT WINDOW

- DOCUMENT DISPLAY PORTION
- OK BUTTON
- CANCEL BUTTON

GRADATION TOOL

- COLOR SELECT 1 BUTTON
- COLOR SELECT 2 BUTTON
- GRADATION PATTERN
- COLOR PALETTE
- OK BUTTON
- CANCEL BUTTON

TEXTURE TOOL

- TEXTURE PATTERN SELECT BUTTON
- TEXTURE PATTERN PREVIEW
- COLOR PALETTE
- OK BUTTON
- CANCEL BUTTON (ENLARGEMENT DISPLAY PORTION)

| 15 | 8 | 7 | 0 |
|---|---|---|---|
| Y-START POSITION (0~255) | | X-START POSITION (0~127) | |

| 15 | 8 | 7 | 0 |
|---|---|---|---|
| Y-END POSITION (0~255) | | X-END POSITION (0~127) | |

| (X1,Y1) | (X2,Y1) | (X3,Y1) | (X4,Y1) | (X5,Y1) |
|---|---|---|---|---|
| (X1,Y2) | (X2,Y2) | (X3,Y2) | (X4,Y2) | (X5,Y2) |
| (X1,Y3) | (X2,Y3) | (X3,Y3) | (X4,Y3) | (X5,Y3) |
| (X1,Y4) | (X2,Y4) | (X3,Y4) | (X4,Y4) | (X5,Y4) |
| (X1,Y5) | (X2,Y5) | (X3,Y5) | (X4,Y5) | (X5,Y5) |

IMAGE EDITING DEVICE PERMITTING USER TO REGISTER DESIRED PATTERNS

BACKGROUND OF THE INVENTION

1. Field of the Invention

The present invention relates generally to image editing devices, and more particularly, to an image editing device capable of displaying a read document for a user to edit the displayed content.

2. Description of the Related Art

There is known a copying machine which reads a document image by an image reader, patterns the background of the read image, and then outputs a copy thereof.

Furthermore, a technique of permitting patterns for patterning to be registered to the device by the operation of the user, according to which the user designates a portion with a pattern to be registered in a document to read, using a separately provided tablet. The document is read by the image reader. Thus, the pattern in the designated portion is registered into the device.

Such a conventional technique however suffers the following first and second problems.

(1) First Problem

According to such a conventional technique, a pattern a user desires to register and a pattern actually registered are sometimes different. This is caused because a range designated by the tablet is different from an actual range in the document. In this case, the user cannot know a registration error until an erroneously registered pattern is output.

(2) Second Problem

Referring to FIG. 55, the user designates the region "A" using the tablet in order to register the pattern formed of oblique lines. The region is registered in the device as a single unit constituting the pattern.

When the registered pattern is actually used for a background, the registered pattern is repeated arranged in both vertical and horizontal directions to form a repeated pattern.

If range "A" in FIG. 55 is used for the repeated pattern, however, the oblique lines of the pattern are disconnected between units, and a pattern looking totally different from the original image of the pattern is output.

SUMMARY OF THE INVENTION

The present invention is directed to solutions to the above described problems, and it is a first object of the invention to provide an image editing device permitting a user to accurately designate a pattern to be registered.

A second object of the invention is to provide an image editing device capable of reproducing a registered pattern faithful to the image of the original.

In order to achieve the above-described objects, an image editing device according to one aspect of the invention includes a circuit for reading a document and obtaining image data, a display circuit for displaying the obtained image data, a designating circuit for designating a part of the displayed image data, and a circuit for registering the designated part of the image data as pattern data for use in editing images.

Preferably, the designating circuit includes a setting circuit capable of arbitrarily setting the size of the part of image data.

More preferably, the image editing device further includes a first display circuit arranging at least two of the same designated parts of image data for display.

Further preferably, the image editing device further includes a second display circuit for expanding the designated part of image data for display.

According to the invention, obtained image data is displayed, and part of the displayed image data can be designated in response to a user input. The designated part of image data is registered as pattern data for use in editing images. Therefore, the user can accurately designate pattern data he/she wishes to register.

In addition, the user can set the size of a part of image data to be designated, and therefore an image editing device capable of reproducing a registered pattern faithfully to the image of the original.

According to another aspect of the invention, the image editing device includes a circuit for obtaining image data, a circuit for displaying the obtained image data, a circuit for designated one point in the displayed image data, and a circuit for registering the image data including the designating point as pattern data for use in editing images.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a table for use in illustration of how to use memory planes in the editing area designation memory;

FIG. 12 is a table showing how memory planes correspond to a document input to memory 620;

DESCRIPTION OF THE PREFERRED EMBODIMENTS

Figure 1:
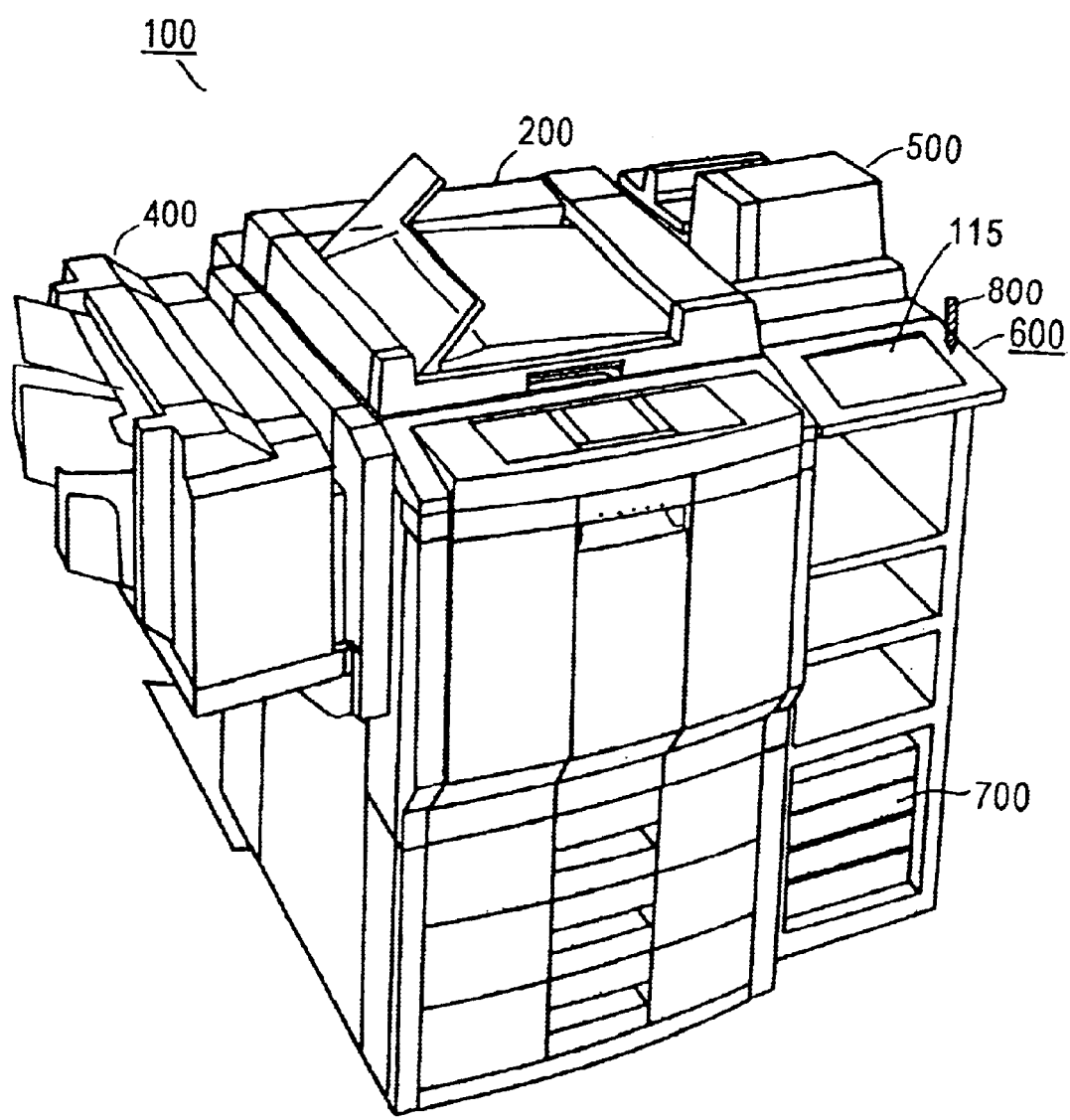
FIG. 1 is a perspective view showing a copying machine according to one embodiment of the invention.

Now, preferred embodiments of the invention will be described in conjunction with the accompanying drawings, in which like reference characters represent the same or corresponding portion.

FIG. 1 is a perspective view showing a digital color copying machine according to one embodiment of the invention.

Referring to FIG. 1, color copying machine 100 includes an automatic document feeder (ADF) for a large volume of documents, a sorter 400 for sorting copy sheets, a film projector 500 for making copies from a film document, a screen editor 600, characteristic to the color copying machine according to this embodiment, and a printer controller 700 connected to a personal computer or an EWS (work station) to use the copying machine as a color printer.

Screen editor 600 includes a color liquid crystal display (LCD) 115 which displays a read document and various operation menus for giving directions to the user in operation.

There is provided, on color LCD 115, a transparent tablet (touch panel) to detect coordinates indicated by the user, and the user can directly input coordinates on the color LCD to the machine using a pen 800.

Figure 2:
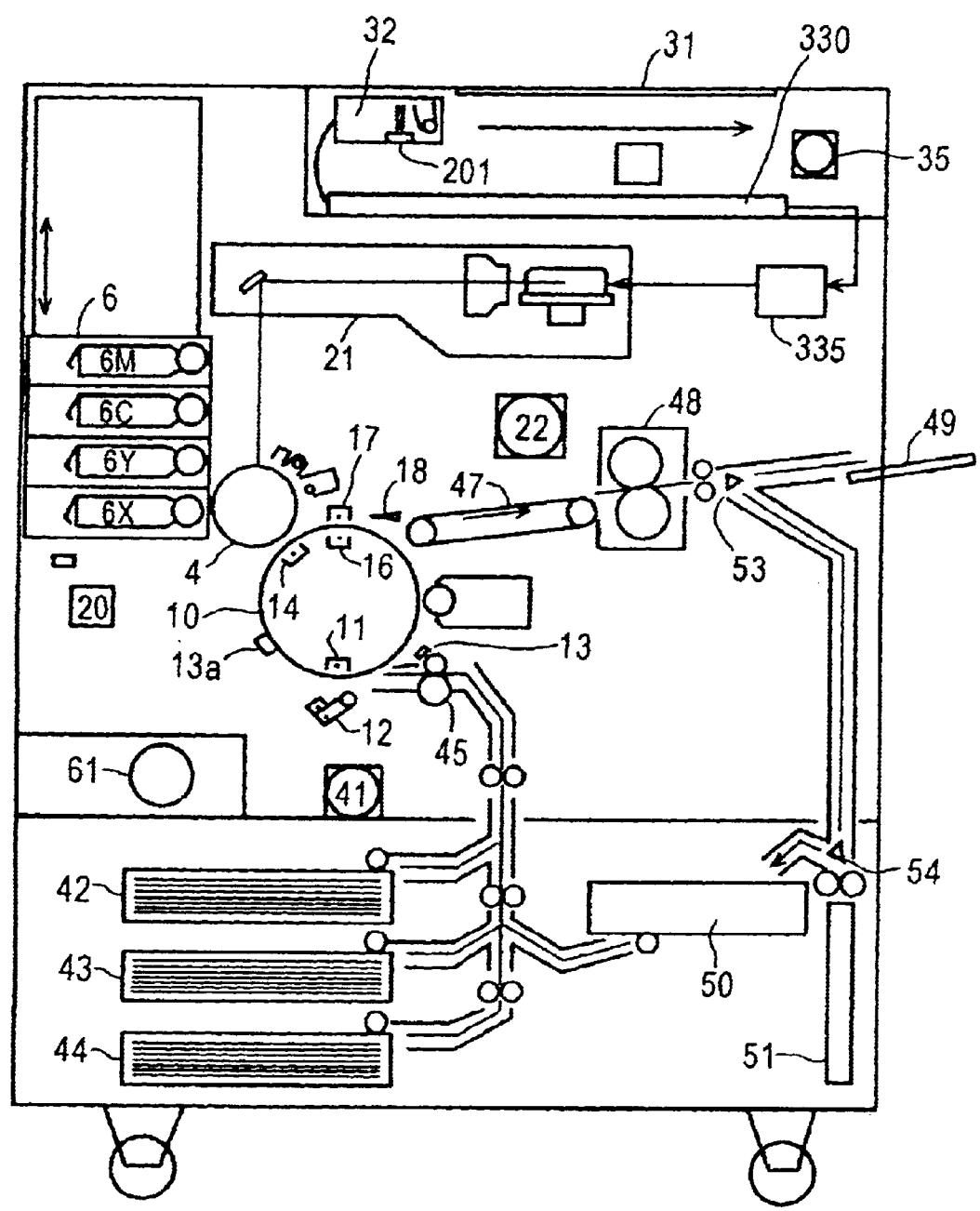
FIG. 2 is a cross sectional view showing the copying machine shown in FIG. 1.

FIG. 2 is a cross sectional view for use in illustration of the mechanism of the color copying machine shown in FIG. 1.

Referring to FIG. 2, the copying machine is roughly divided into an image reader portion 30 and a printer portion 20, each of which will be detailed below.

(1) Image Reader Portion 30

Image reader (IR) portion 30 includes a platen 31 to place a document, a scanner 32 to scan a document by exposure, an image sensor (CCD) 201 to sense light reflected from a document, an image signal processing portion 330 to process a signal from the image sensor, a print head (PH) control portion 335 to output a control signal to the printer portion based on a signal from the image signal processing portion, and a pulse motor 35 to drive scanner 32.

The image of a document placed on platen 31 is exposed to light and scanned, and light reflected from the image is photoelectrically converted by image sensor 201. The signal resulting from the photoelectric conversion is subjected to a prescribed processing in image signal processing portion 330, and digital image data for driving a laser diode is produced. Thus produced digital image data is transmitted to print head control portion 335.

(2) Printer Portion 20

Printer portion 20 is roughly divided into an image forming portion and a developing unit portion, and a sheet processing portion, each of which will be separately described.

(a) Image Forming Portion

The image forming portion includes a laser device 21 driven based on the digital image data transmitted from image reader portion 30, a photoreceptor drum 4 to write an electrostatic latent image, a developing unit 6 for development with toner, a transfer drum 10 to transfer an image onto a surface of a sheet, and a drum drive motor 22 to drive the photoreceptor drum and transfer drum.

Laser device 21 is driven based on input digital image data. By driving laser device 21, an electrostatic latent image forms on the surface of photoreceptor drum 4. The electrostatic latent image is developed with toner by developing unit 6, and transferred onto a surface of a printing sheet placed on transfer drum 10.

Note that photoreceptor drum 4 and transfer drum 10 are driven in synchronization with each other by drum drive motor 22.

(b) Developing Unit 6

Developing unit 6 includes a magenta developer 6M for development with magenta toner, a cyan developer 6C for development with cyan toner, a yellow developer 6Y for development with yellow toner, a black developer 6K for development with black toner, four toner hoppers for supplying toner of a color corresponding to each developer, and a developing unit motor 61 for moving developing unit 6 in upward and downward directions.

(c) Sheet Processing Portion

The sheet processing portion includes storage cassettes 42–44 for storing sheets for printing, and an intermediate storage portion 50 for temporarily storing a sheet.

A sheet taken out from any of storage cassettes 42–44 or a sheet supplied from intermediate storage portion 50 is sent to transfer drum 10 by a group of transport rollers and wound around transfer drum 10. Then, toner images on photoreceptor drum 4 (in four colors at most) are sequentially transferred onto the sheet.

The sheet with the transferred image is separated from transfer drum 10, followed by fixing at a fixing device 48 and discharged onto a discharge tray 49.

The machine is provided with a pair of timing rollers 45 for providing timing for registration at the time of transporting the sheet and a transfer belt 47.

Note that the group of transport rollers and transfer belt 47 are driven by main motor 41.

Transfer drum 10 is provided with a tip chuck claw for chucking the tip of a sheet, an attraction charger 11 electrostatically attracting the sheet to transfer drum 10, a roller 12, a press-roller 12 for press-holding the sheet, a transfer charger 14 for sucking a toner image appearing on the photoreceptor drum onto the sheet for transfer, dischargers 16, 17 for electrically discharging the transfer drum to separate the sheet therefrom after the toner image has been transferred (the toner images for four colors have been transferred in the case of full color development), and a separation claw 18 for removing the sheet from the transfer drum.

The sheet after the above printing steps is brought into intermediate storage portion 50.

Whether to transport the sheet after the printing steps to discharge tray 49 or to intermediate storage portion 50 is determined based on the switching of a transport path switch portion 53 provided in the path transporting the sheet after the fixing processing.

Another transport path switching portion 54 is provided in the transport path toward intermediate storage portion 50. Transport path switching portion 54 selects whether to store the sheet into intermediate storage portion 50 after transporting the sheet in a switched back manner by a reversing device 51, or directly into intermediate storage portion 50.

Such selection is made for the purpose of determining whether to transfer an image on the side of the sheet which has been already printed (such transfer mode is called "image overlapped mode") or to transfer the image on the back side (which is called "duplex copy mode"), when the sheet supplied from intermediate storage portion 50 is once again transferred to the transfer drum.

The transfer drum is further provided with a reference position sensor 13 for detecting the reference position of the transfer drum, and an actuator plate 13a for operating the reference position sensor.

The operations of their image reader portions and printer portions will be described later.

Figure 3:
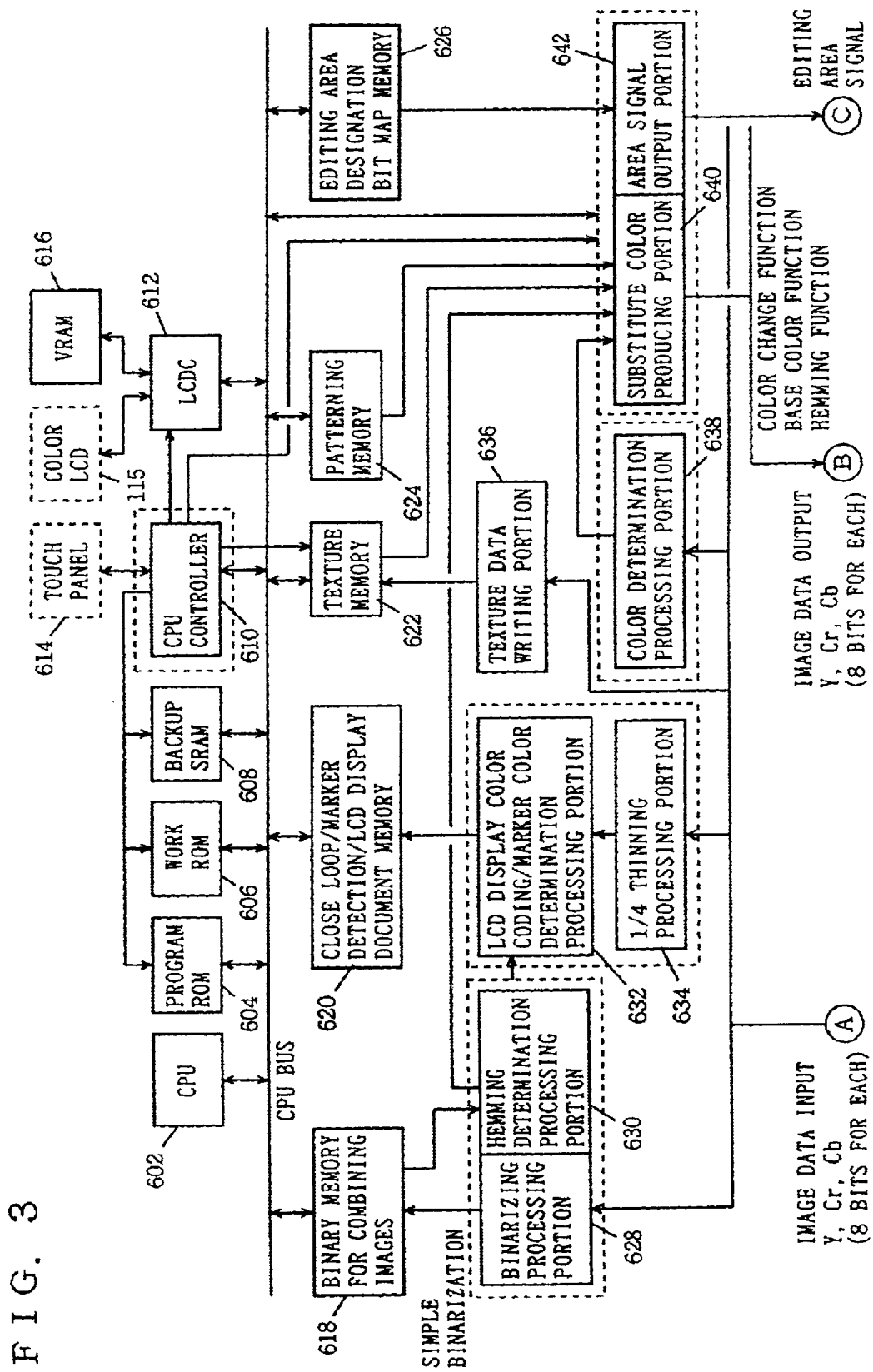
FIG. 3 is a block diagram showing a screen editor included in the copying machine shown in FIG. 1.
Figure 4:
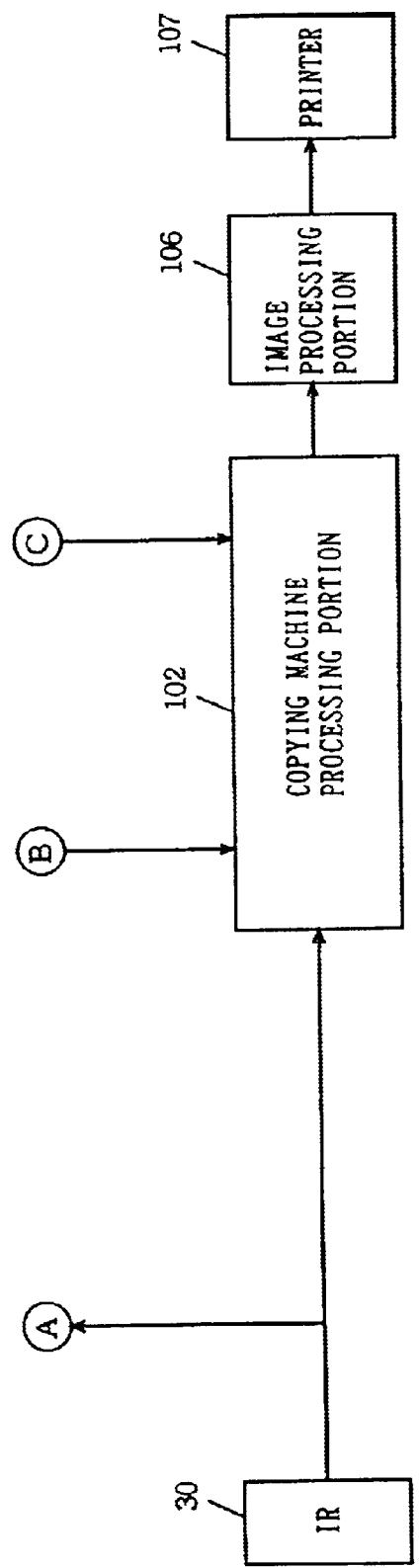
FIG. 4 is a block diagram showing a main portion of the copying machine shown in FIG. 1.

FIG. 3 is a block diagram showing an electronic circuit for image processing included in the screen editor in the copying machine shown in FIG. 1, and FIG. 4 is a block diagram showing an image processing circuit included in the main body of the copying machine. FIGS. 3 and 4 are connected at positions A, B and C.

Referring to FIG. 3, the screen editor includes the following elements.

(a) Binary Memory for Combining Images (618)

The memory 618 stores a binary signal of a signal representing the luminance of document information (Y). The image of a black-and-white document is stored in the memory, and used as character information when combined with a color document (character combining function).

(b) LCD Display Document/Closed Loop·Marker Detection Memory (620)

In the color document editing mode, the memory converts document information into data to be input to the color pallete of the LCDC (LCD Controller) for display on the LCD and stores the data thinned to 100 dpi. More specifically, the number of colors in a document image is reduced to the number which can be displayed on the LCD and stored.

In the black-and-white document editing mode, the memory thins binary signals of 1 bit black-and-white (closed loop detection) information, 3 bit color information (R, G, B, C, M, Y) and 4 bit black-and-white gradation (for display) in a document to 100 dpi for storing.

Document information within the memory is transferred to a VRAM by the CPU for display.

In the black-and-white editing mode, the CPU detects a closed loop, a marker point position, and a marker closed loop in the document based on the information within the memory and produces editing area designation information.

As described above, the memory advantageously changes the method of storing based on the mode selected.

(c) Editing Area Designation Memory (626)

In the memory, 16 kinds of editing area signals are set as bit map information by the CPU based on coordinate designation from closed loop·marker detection memory 620 and the touch panel 614 of the editor. The output of area signals is controlled separately among editing functions based on the editing area information within the memory.

(d) Picture Memory (622)

The memory stores various patterns read from documents for later use in the background or the like of a document, and data for processing background gradation. The background gradation processing data is set by the CPU. Based on image data stored in the memory, a color document is provided with patterns and the background gradation processing for a black-and-white document is performed. The memory has a maximum scanning cycle (horizontal scanning) of 128 dots, a vertical scanning cycle of 256 dots, and a gradation (luminance) of 256 levels.

(e) Patterning Memory (624)

The memory stores binary data in the form of patterns for patterning processing. The pattern form binary data stored in the memory are used for patterning a black-and-white document. The pattern form binary data in the memory is set by the CPU. The memory has a pattern size of 128 dots (horizontal scanning) and 256 dots (vertical scanning) and there are eight kinds of patterns.

(f) Binarizing Portion (628)

The binarizing portion writes a simple binary output of a write signal (Y) from document input data to binary memory 618 during prescanning. During image reproducing scanning, the simple binary output of write signal (Y) from the document input data is output to a substitute color data producing portion 640 as character region determination data.

During the image reproducing scanning, the binary outputs of luminance signal (Y) and color saturation signal (G) of the document input data are output to substitute color data producing portion 640 as base region determination data.

(g) Hemming Determination Portion (630)

The hemming/cut out of image data in the area designated by the editing area signal is determined, and the determination information is output to substitute color data producing portion 640. During the hemming determination, prescribed determinations are made for the following functions.

Hemming function: the hemming edge of a binarized input image is detected, and the edge determination information is output to the substitute color data producing portion.

Cut out function: the inner edge of the binarized input image is detected, and the edge determination information is output to the substitute color data producing portion.

(h) Marker Color Determination·LCD Display Image Data Coding Processing Portion (632)

In the black-and-white document editing mode, during prescanning, document input data is divided into seven kinds, i.e., black-and-white and colors (R, G, B, C, Y and M) and output to LCD display document/closed loop·marker detection memory 620.

In the color document editing mode, during prescanning, document input data is converted to color codes for LCD display, and output to the LCD display document/closed loop·marker detection memory 620.

Data is written into LCD display document/closed loop·marker detection memory 620 for each 4 lines in the vertical scanning valid period.

Marker color determination·LCD display is retrieved from an ROM using Y, Cr, Cb as address information. An ROM table (256K×8 bits) is installed for coding image data for marker color determination·LCD display.

(i) ¼ Thinning Processing Portion (634) During prescanning, document input data is subjected to simple thinning for each 4 dots in the horizontal scanning direction, and the resulting data is output to marker color determination·LCD display image data coding processing portion 632.

(j) Picture Data Writing Portion (636)

During prescanning, the luminance signal (Y) of part of document input data (128×256 dots) is written into the texture memory.

(k) Color Determining Portion (638)

The color determining portion determines the colors of image data in the area designated by the editing area signal and outputs the determination information to substitute color data producing portion 640. The portion makes a prescribed determination for each function as color determination as follows.

Color change function: to determine whether an input image is of a designated document color and outputs the determination information to the substitute color data producing portion.

Picture function: to determine whether an input image is of a designated document color and the determination information is output to the substitute color data producing portion (designated color texture function).

Color determination portion 638 is provided with an ROM table for transforming color determination polar coordinates.

(l) Substitute Color Data Producing Portion (640)

The portion changes the colors of image data in an area designated by an editing area signal and outputs image data partly substituted by hemming editing instruction information. The substitute color data processing includes a prescribed conversion for each function as follows.

Color change function: a designated document color is changed to a designated substitute color (color region).

Texture function: a designated document color is changed into a texture memory data (color region).

Background color substitution function: a white region is changed into a region of a designated substitute color and a pattern (monochrome region).

Hemming function: the colors of an edge portion and an image inside the edge are changed into separate designated substitute colors (monochrome region).

(m) Area Signal Output Portion (642)

The area signal output portion changes an area signal designated by editing area memory 626 into an editing attribute signal to be output to the copying machine main body, and outputs an editing instruction signal to the hemming determination processing portion, color determination processing portion and substitute data producing portion. The attribute signal output to the copying machine main body is a monocolor/monochrome indication signal, negative/positive determination indication signal, or an image substitute/image erase/character combining indication signal.

(n) VRAM (616)

The VRAM is an image memory to store image data displayed on an LCD. Image data is written into the memory by the CPU. The image data within the memory is displayed on the LCD by the LCDC.

(o) LCDC (612)

The LCDC controls the LCD (VGA: 640×480/256 colors) and VRAM, and reads image data set in the VRAM for display on the LCD.

(p) CPU (602)

The CPU controls the display of LCD and produces editing area information.

(q) CPU Controller (610)

The CPU controller controls the address decoding and a bus when externally accessed. The controller controls input/output to/from the CPU through touch panel I/F.

(r) Program ROM (604)

The ROM stores programs for the CPU.

(s) Work RAM (606)

The RAM is for work/stack for the CPU.

(t) Backup SRAM (608)

The SRAM includes a built in battery to store backup parameters. The parameters are written by the CPU.

(u) Color LCD (115)

(v) Touch Panel (614)

(w) Texture Data Register (613)

The register registers a position or the like in a document with patterns designated by a user.

Referring to FIG. 4, the copying machine main body includes an image reader 30, a copying machine processing portion 102 for converting a signal output from the image reader, an image processing portion 106 for processing a signal output from the copying machine processing portion 102, and a printer for printing an image corresponding to an output signal from the image processing portion.

Image reader 30 outputs 8 bit image data for each of Y, Cr and Cb. The output image data is input to the screen editor and copying machine processing portion 102. Copying machine processing portion 102 are provided with image data from image reader 30, 8 bit image data for each of Y, Cr and Cb output from the screen editor, and an editing area signal, and outputs processed image data.

Figure 5:
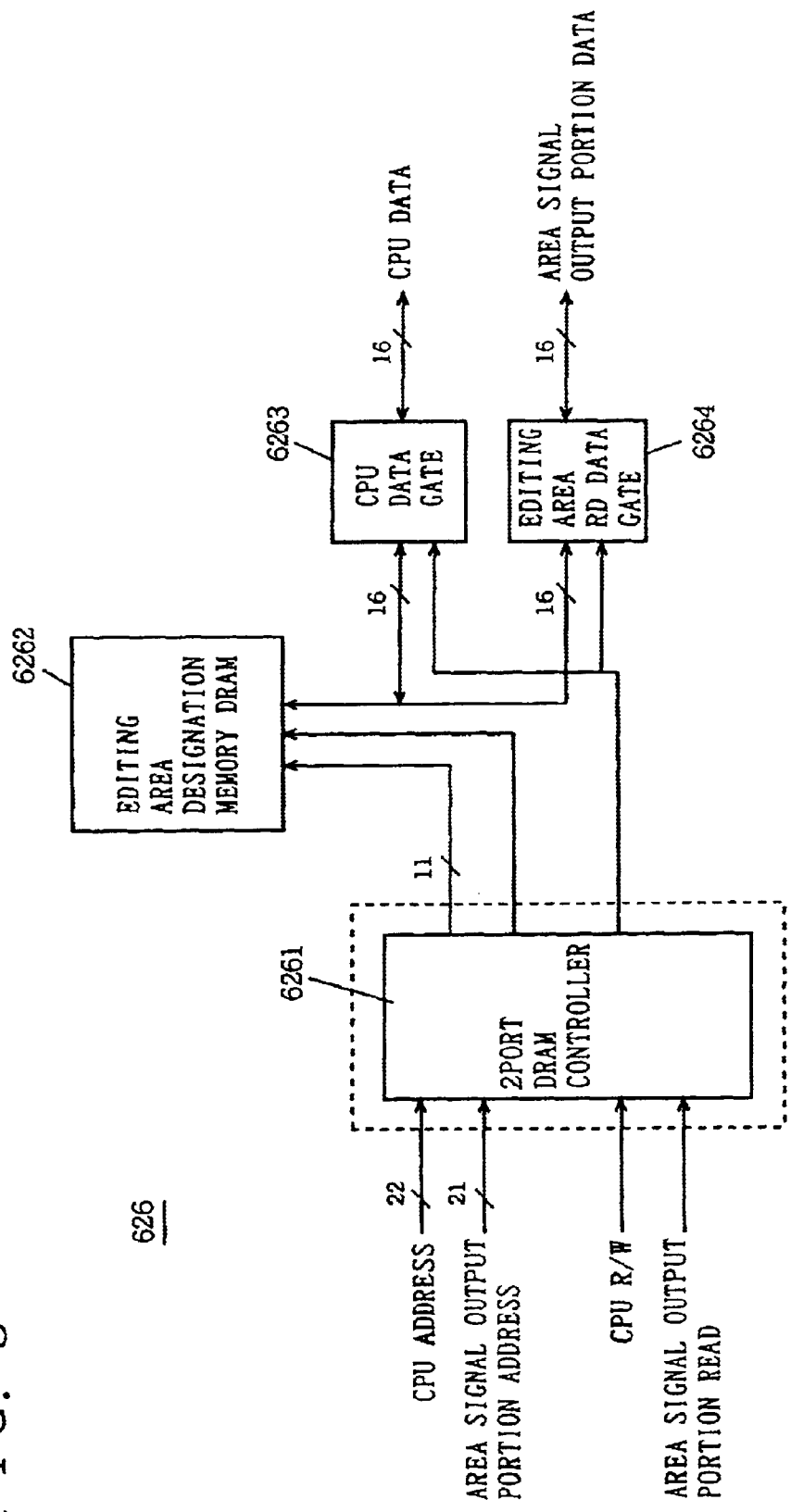
FIG. 5 is a block diagram showing the configuration of an editing area designation memory 626.

FIG. 5 is a block diagram showing in detail the configuration of editing area designation memory 626.

The memory thins binary signals of 1bit for black-and-white and 3 bits for colors (R, G, B, C, M, Y) to 100 dots for storing. The memory also functions as a closed loop·marker detection memory. The memory also stores an editing area based on designated coordinates input through the touch panel. The memory stores 16 kinds of editing area signals as bit map information.

Editing area designation memory 626 includes a DRAM 6262, a controller 6261 for the DRAM, a CPU data gate 6263, and the data gate 6264 of the editing area signal output portion. DRAM controller 6261 is provided with a CPU address, an area signal output portion address, a CPU read/write signal, and data from the area signal output portion. CPU data gate 6263 exchanges data with the CPU. Editing area output portion data gate 6264 outputs data to area signal output portion 642.

Figure 6:
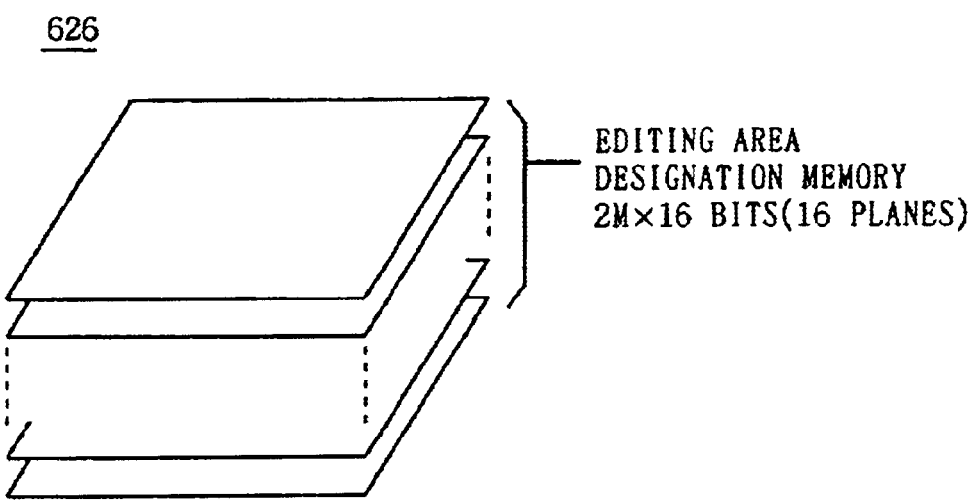
FIG. 6 is a view for use in illustration of the structure of editing area designation memory.

FIG. 6 is a diagram showing the planes of editing area designation memory. Referring to FIG. 6, the editing area designation memory is formed of 16 planes. One plane has a capacity of 2 Mbytes, and used to specify the position to edit in an input image data. The role of each plane in the editing area designation memory changes for each editing mode or each editing function.

FIG. 7 is a diagram showing how the memory planes of the editing area designation memory are allocated in each mode.

Referring to FIG. 7, the role of memory plane in each of bits 0 to 15 is described separately for the case of a black-and-white document, a color document, and black-and-white+color document.

Herein, the black-and-white document includes a document without coloring, and a black-and-white document having an area designated with a color marker by the user for the purpose of editing. The color document is a document such as a photograph. Black-and-white+color document is a document including both a black-and-white portion and a color portion.

Referring to FIG. 7, for a black-and-white document read, bit 0 is used as an erase area code. Herein, an image in a region designated by the erase area code is to be erased.

Bits 1 to 15 are used as the 1st to 15th character/base processing area codes. Thus, an editing processing corresponding to a region designated by each bit is executed.

If a color image document is input, bit 0 is used as an erase area code. Bit 1 is used as a negative/positive reversing area code. Bit 2 is used as a code for an area to be provided with patterns.

Bits 3 to 5 are used as first to third monochrome area codes to allocate first to third monochrome areas.

Bits 6 to 9 are used as first to fourth color change area codes to allocate first to fourth color change areas.

Bits 10 to 15 are used as first to sixth character/base processing area codes to allocate first to sixth character/base processing areas.

For a black-and-white+color document read, bits 0 and 1 are used as an image combining indication area. If the number indicated by bits 0 and 1 is "0", overlap combining is performed, for "1", fit in/character combining is performed, for "2", the image is erased, and for "3", no image is combined.

Bits 2 to 15 are used as area codes to allocate first to fourteenth fit in combining/character combining, editing within a black-and-white document and window designation areas.

Thus, the editing area designation memory is used in different ways based on the input image data.

Now, data stored in the editing area designation memory will be described by way of example.

Figure 8A:
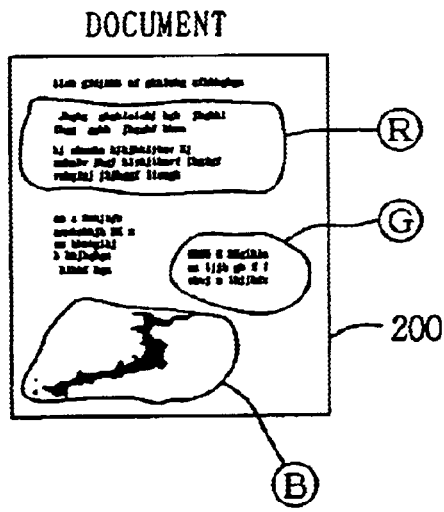
FIGS. 8A and 8B show the relation between a read document and data stored in the memory.
Figure 8B:
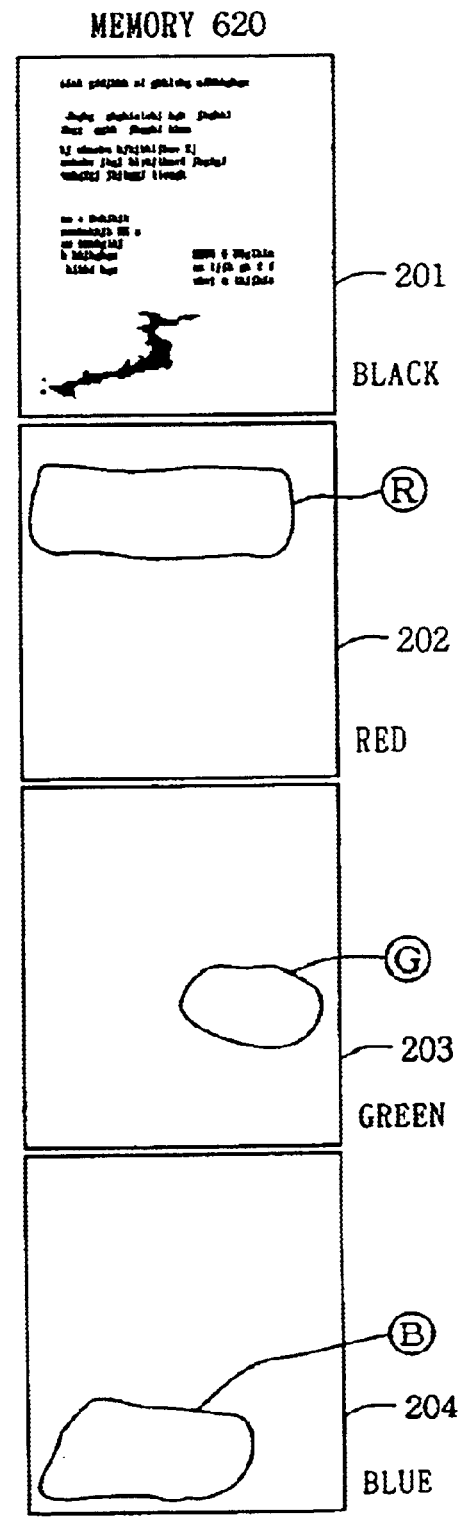

Referring to FIG. 8A, the processing will be detailed when there are regions surrounded by a red marker (R), a green marker (G), and a blue marker (B) in part of a black-and-white document read by the image reader.

The document is read by image reader 30, binarized at binarizing processing portion 628 and stored in closed loop/marker detection/LCD display document memory 620.

At the time, in memory 620, as shown in FIG. 6B, data for only the black-and-white portion of the document is stored in a plane 201 to store black data.

Meanwhile, in a plane to store the marker color code of each of green and blue, as indicated by codes 202 to 204, only images in the portion corresponding to each marker color in the document are stored.

The document image stored in memory 620 is transferred to VRAM 616 through CPU 602, and then output to color LCD 115.

At the time, manually or by automatic setting with a device, whether to directly display the read document or to display an image after the image processing by the markers is selected.

Figure 9A:
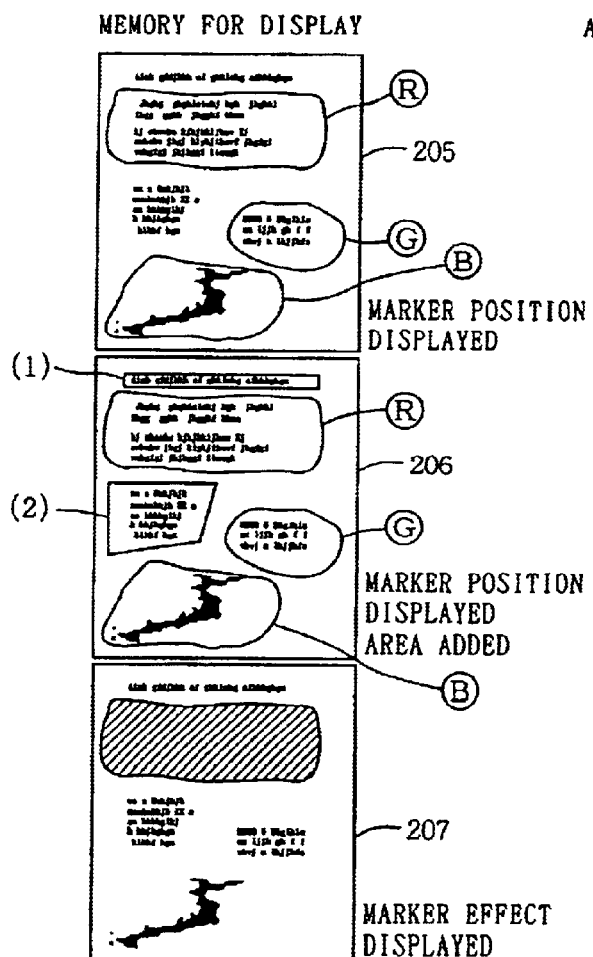
FIGS. 9A and 9B show the relation between data stored in the area designation memory and an image displayed on an LCD.

More specifically, referring to FIG. 9A, if the mode to directly display the figures delineated by the markers is selected, the image the same as the read document image is stored in the VRAM as shown in image 205, and displayed on color LCD 115.

Meanwhile, the mode to display the effect of image processing by markers (the mode to display an image after image processing) is selected, based on the color of the marker as indicated by image 207 and its position, an image after image processing will be displayed. Note that the region surrounded by the red marker is hatched, the region surrounded by the green marker is colored, and a figure in the region surrounded by the blue marker has been reduced.

As image 205 is displayed, the user can mark with markers to the image being displayed through touch panel 614. For example, the user can additionally mark regions (1) and (2) to image 205 as in image 206 through touch panel 614.

More specifically, the user can know the states before and after image processing, make marking with markers for image processing through touch panel 614, which makes the machine easier to handle.

In editing area designation memory 626, data used for editing a black-and-white document is stored in each bit. More specifically, figures indicating editing regions set by marking with markers or input through the touch panel by the user are stored in the regions of bits 1 to 15.

Figure 9B:
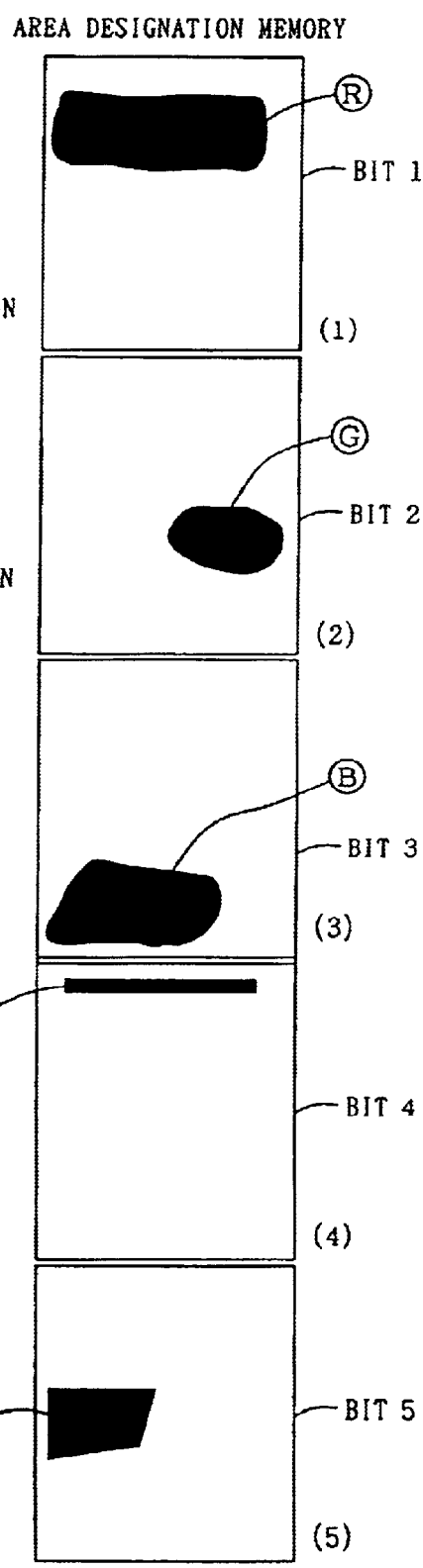

Now, let us assume that an editing area as indicated by code 206 in FIG. 9A is set. Referring to FIG. 9B, the region surrounded by red marker (R) drawn in a black-and-white document is stored in bit 1 in area designation memory 626 in the state in which the inside the region is painted out. Note that the painted out position is stored with data of "1", and otherwise data of "0" is stored.

Similarly, the regions surrounded by green (G) and blue (B) being painted out are stored in bits 2 and 3, respectively in area designation memory 626.

The region of portion (1) input through the touch panel is stored in bit 4 in the area designation memory as being painted out, and the region (2) input through the touch panel is stored in bit 5 as being painted out.

Area signal output portion 642 recognizes the painted out regions stored in the memory, identifies these painted out regions to be regions for image processing, and outputs an editing area signal to copying machine processing portion 102.

Figure 10:
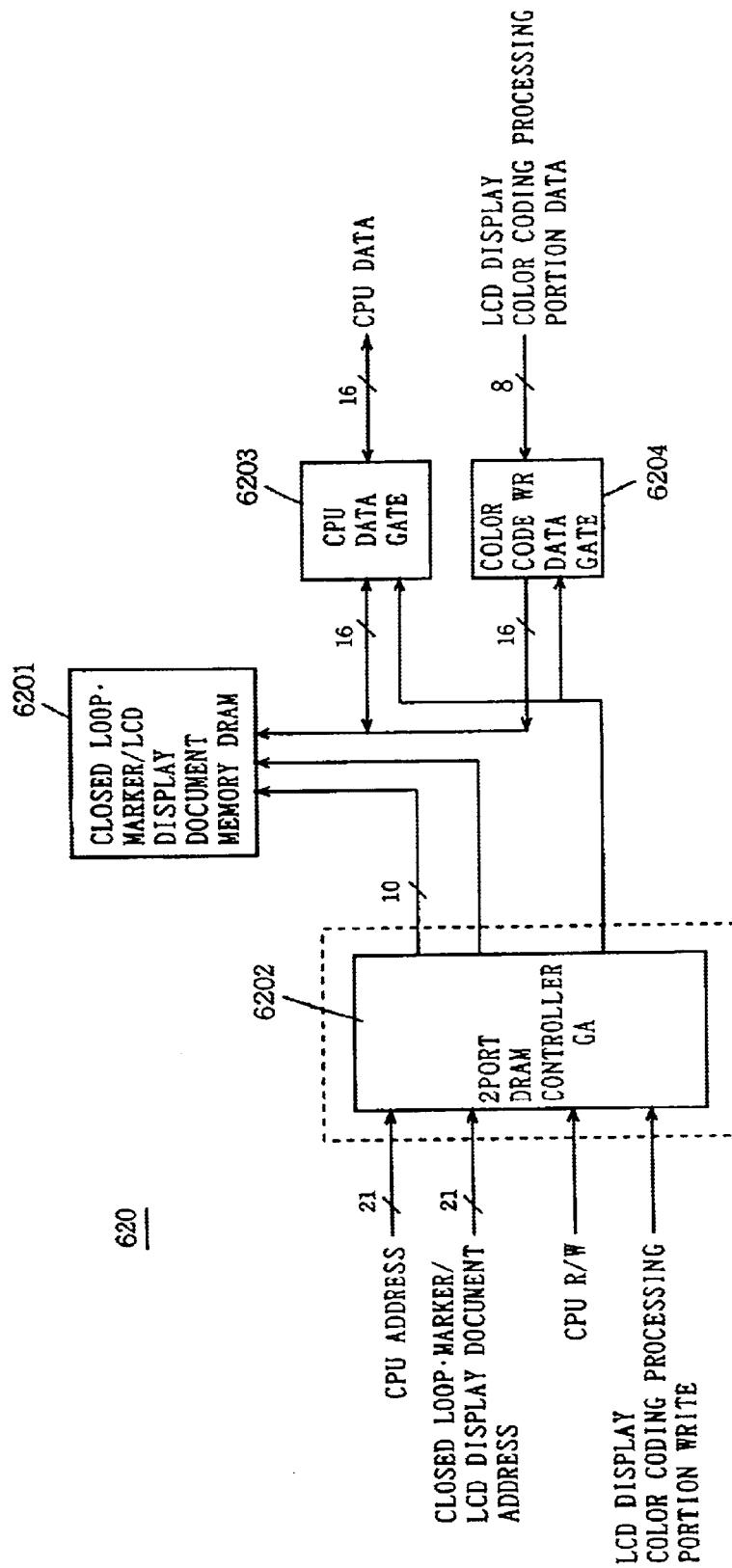
FIG. 10 is a block diagram showing the configuration of a closed loop/marker detection/LCD display document memory 620.

FIG. 10 is a block diagram specifically showing the configuration of closed loop·marker detection memory/LCD display document memory 620.

Referring to FIG. 10, the memory stores color coding data for closed loop·marker determination data/LCD display which is produced by thinning document information to 100 dpi. The document information in the memory is transferred to the VRAM by the CPU and displayed on the LCD. In the black-and-white document mode, the closed loop·marker is detected by the CPU. The memory can be accessed by the CPU, the marker determination processing portion, and the LCD display color coding processing portion.

Referring to FIG. 10, memory 620 includes a DRAM 6201, a controller 6202 for the DRAM, a CPU data gate 6203, and a color code write/read data gate 6204.

DRAM controller 6202 is provided with a closed loop·marker/LCD display document address, a CPU write/read signal, and a write signal for the LCD display color coding processing portion.

CPU data gate 6203 exchanges data with the CPU. Color code WR data gate 6204 is provided with data from the LCD display color coding processing portion.

Figure 11:
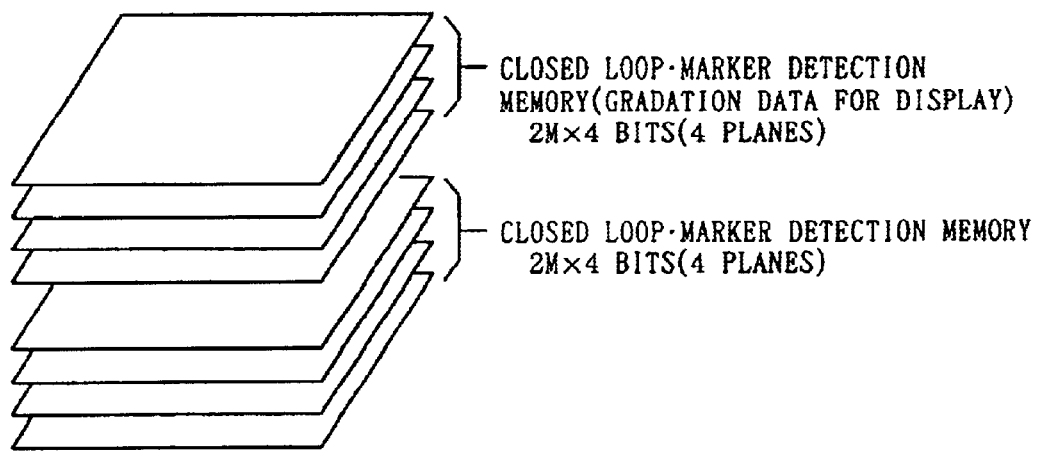
FIG. 11 is a view for use in illustration of the structure of memory 620 in a black-and-white document mode.

FIG. 11 is a diagram for use in illustration of the arrangement of planes in the closed loop·marker detection/LCD display document memory.

Referring to FIG. 11, there are eight layers of planes. The roles of these planes are different among different modes. FIG. 11 shows the arrangement of planes when an input document image is a black-and-white document image. Referring to FIG. 11, four planes are used for black-and-white gradation data for displaying the black-and-white document image on the LCD, and the other four planes are used as a memory for detecting closed loops and markers.

Meanwhile, for a color document or a black-and-white+color document, all the planes function as planes to store data for display on the LCD.

FIG. 12 is a diagram for use in illustration of how the role of a memory plane change depending upon the kind of a read document.

Referring to FIG. 12, as described above, for an input black-and-white document, memory planes of bits 4 to 7 are used for gradation data for displaying the black-and-white document, and bits 1–3 are used as codes for marker colors. The number "0" indicated by bits 1 to 3 represents a region without any marker, "1" a region in red, "2" a region in green, "3" a region in blue, "4" a region in cyan, "5" a region in magenta, and "6" a region in yellow.

The frame indicated by bit 0 is black-and-white binary data, and used to detect a closed loop present in the black-and-white document. Herein, the closed loop means a closed region delineated by a black line in the document. The user can designate the closed region by a marker or through type touch panel to color the region or hatch the region.

When an image in a read document is directly used as data to identify a closed loop, the line defining the closed loop may be sometimes disconnected depending on the characteristic of a CCD used and the closed loop may not be recognized successfully. As data in the plane of but 0, data produced by closing the line which defines the closed loop is stored. The closing processing will be described later.

Meanwhile, if a color document or a black-and-white+color document is input, data for display on the LCD is stored in bits 0 to 7 in all the memory planes. More specifically, one dot will be displayed by 8 bit data on the LCD. The input color document has its tonality lowered to the tonality which can be represented by the LCD display codes and stored in the memory.

Figure 13:
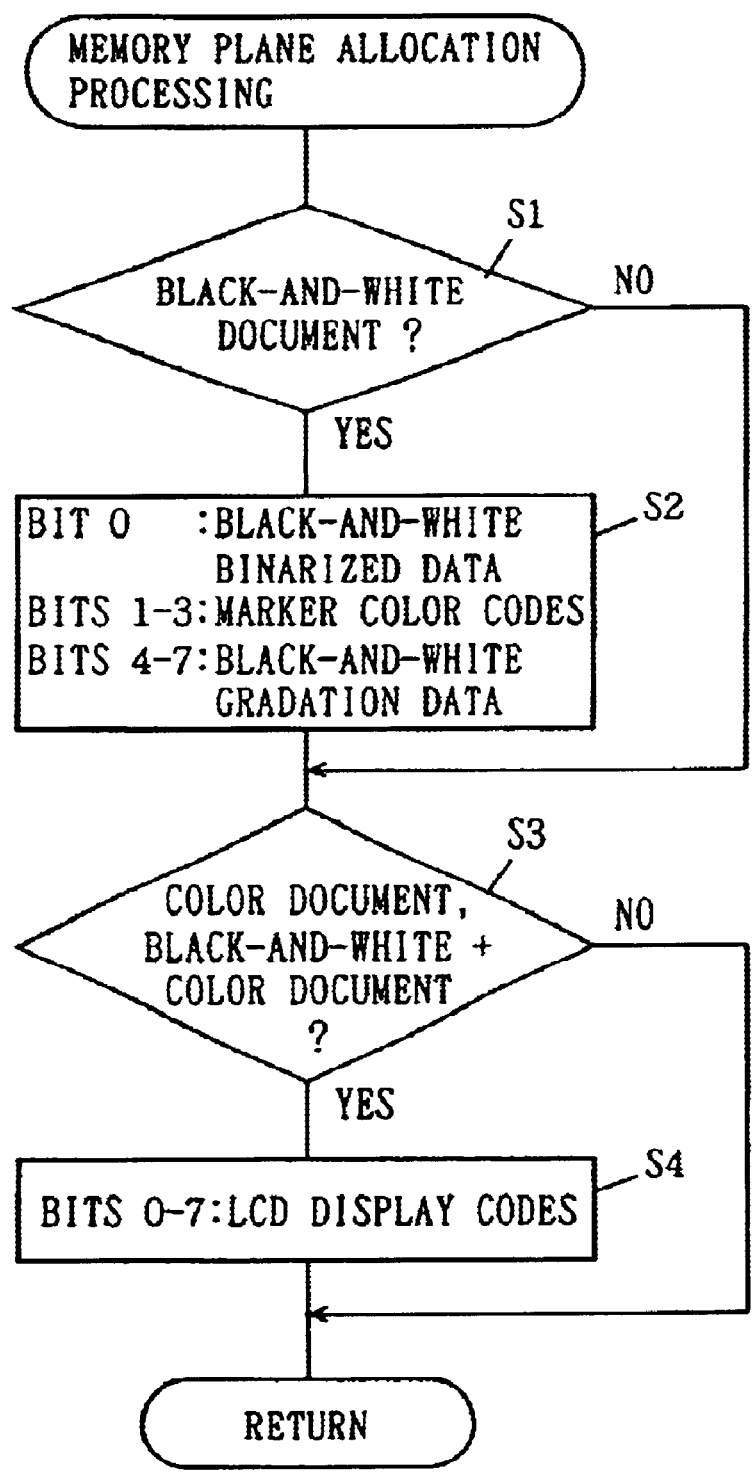
FIG. 13 is a flow chart for use in illustration of the processing of allocating memory planes.

Thus, the processing of switching the role of memory depending upon the content of an input document may be conducted by hardware, or maybe conducted by a flow as shown in FIG. 13.

Referring to FIG. 13, when the mode to process a black-and-white document is selected (YES in S1), the memory planes are allocated for the black-and-white document (S2). Meanwhile, the color document mode or the black-and-white+color document mode is set (YES in S3), the same memory planes for color are allocated (S4).

Figure 14:
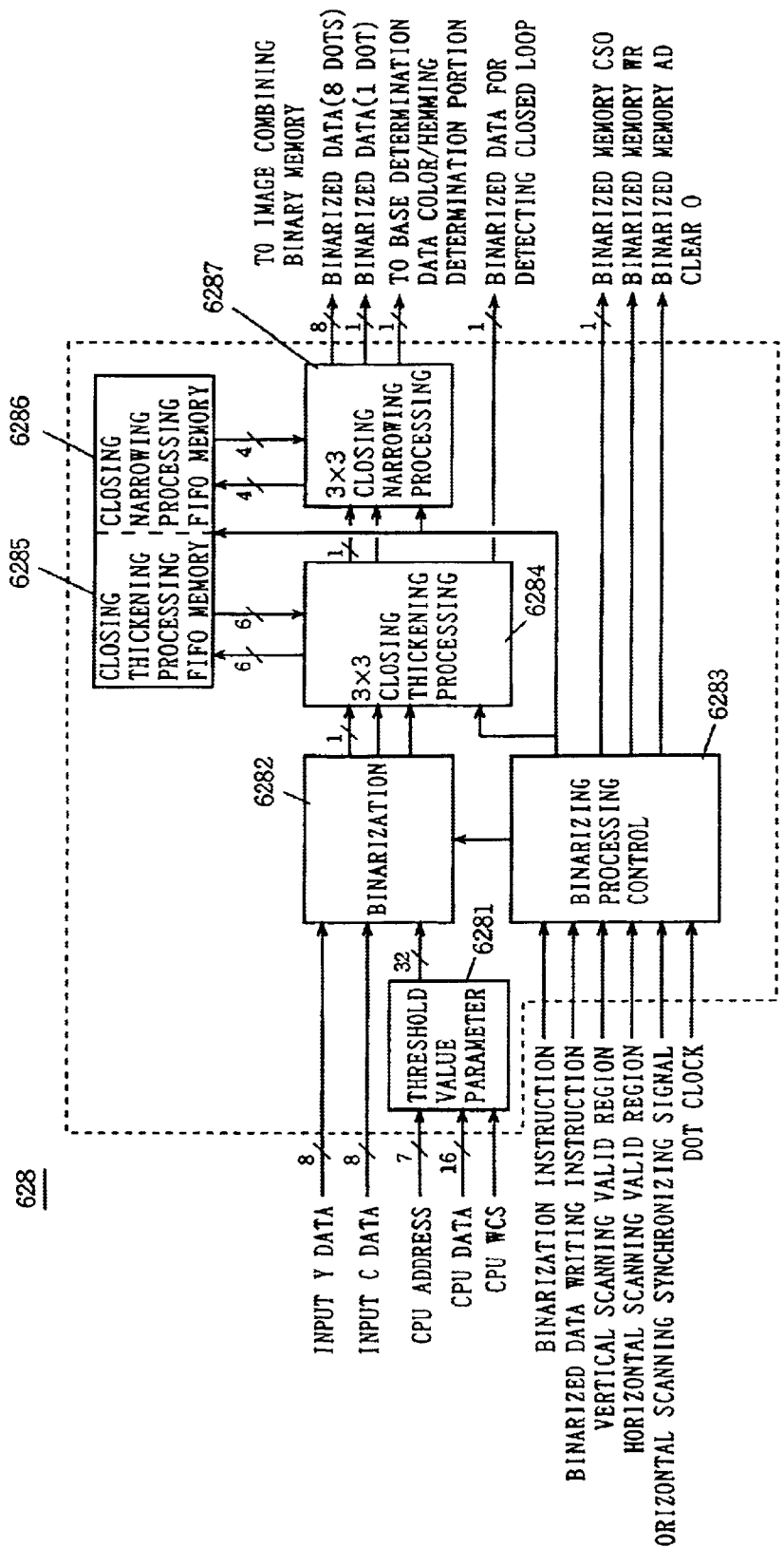
FIG. 14 is a block diagram showing the configuration of a binarizing processing portion 628.

FIG. 14 is a block diagram showing in detail the configuration of binarizing processing portion 628.

In the configuration, a binarized document image is produced based on the luminance signal (Y) and color saturation signal (C) of document information and threshold parameters. The binarized document image is subject to 3×3 dots closing processing and stored in the binary memory.

Referring to FIG. 14, the block includes a threshold parameter output portion 6281 for outputting threshold parameters, a binarizing processing portion 6282 for binarizing an input document image, a control portion 6283 for controlling the binarizing processing, a widening processing 6284 for widening the binarized document image for closing, a narrowing processing portion 6284 for narrowing the thickened document image, an FIFO memory 6285 used for the thickening processing and an FIFO memory 6286 for the narrowing processing.

Binarizing processing portion 6283 is provided with the luminance signal (Y) and color saturation (C) of document information. Threshold parameter output portion 6281 is provided with a CPU address, data from the CPU and a write clock signal from the CPU.

Binarizing processing control portion 6283 is provided with a binarizing instruction signal, a binarized data writing instruction signal, a vertical scanning valid region, a horizontal scanning valid region, a horizontal scanning synchronizing signal, and a dot clock.

Narrowing processing portion 6287 outputs binary data after closing, and base determination data. Widening processing portion 6284 outputs binary data for detecting a closed loop.

Binarizing processing control portion 6283 outputs a clock signal, a write signal and an address clear signal to the binary memory.

Figure 15:
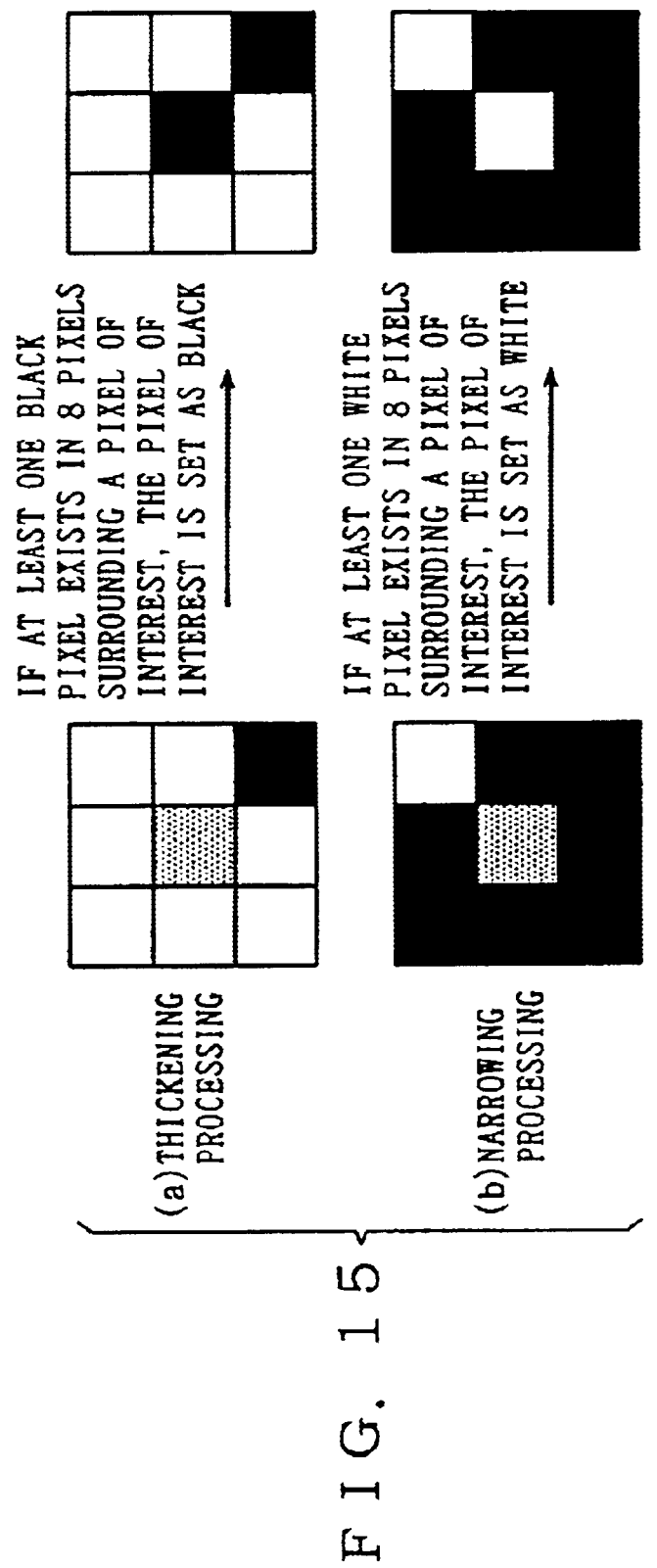
FIG. 15 is a diagram for use in illustration of a closing processing.

Now, referring to FIG. 15, the closing processing will be detailed.

During the closing processing, if there is at least one black pixel among 3×3 pixels around a pixel of interest (the pixel hatched in FIG. 15), a pixel of interest is processed as a black pixel (thickening processing), and then if there is at least one white pixel among 3×3 pixels, a pixel of interest is processed as a white pixel (narrowing processing).

Thus, the line defining the contour of the closed loop will have no disconnected part, and the contour can be accurately determined when the inside the loop is colored.

Figure 16:
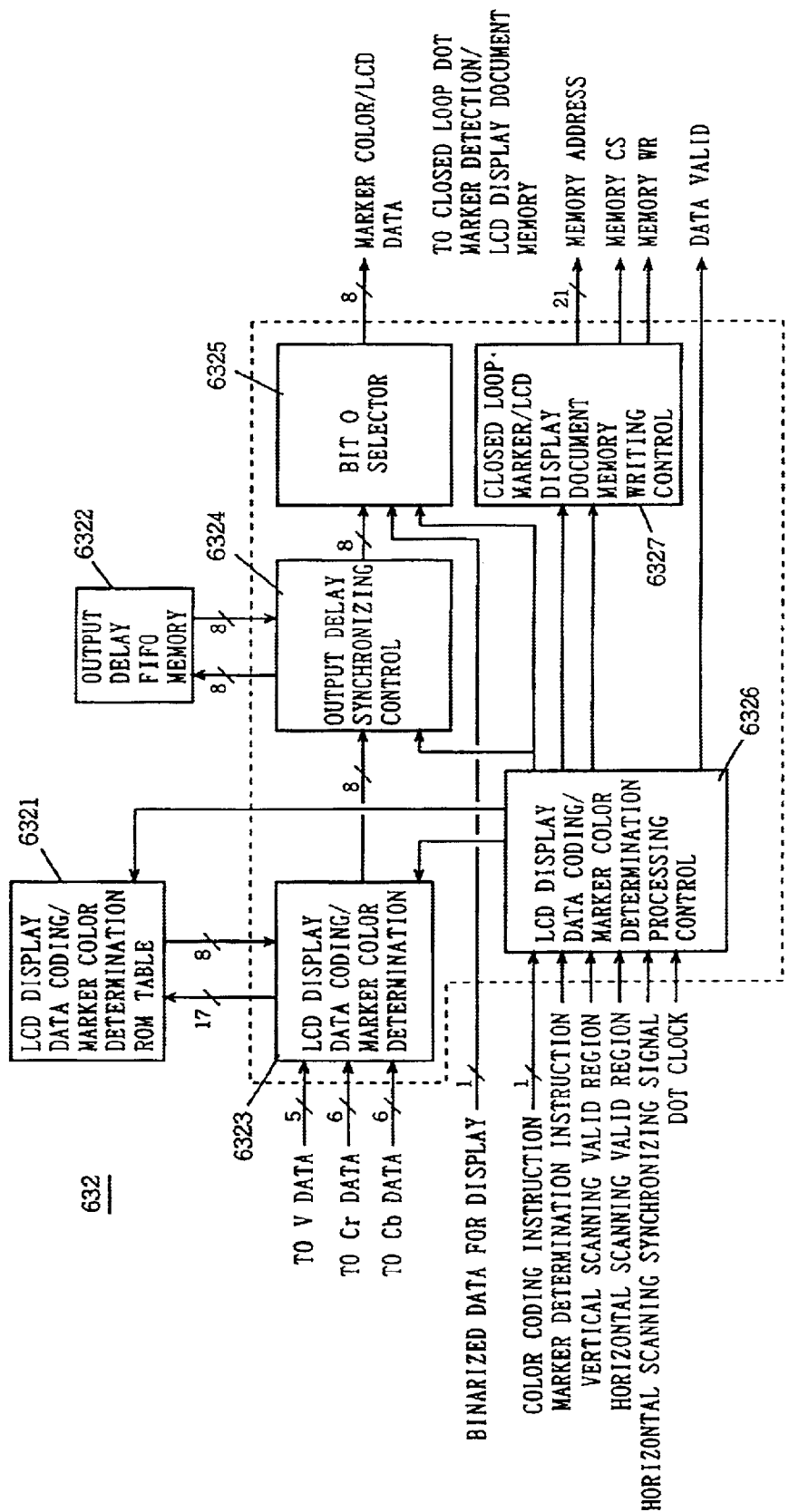
FIG. 16 is a block diagram showing the configuration of an LCD display color coding/marker color determination processing portion 632.

FIG. 16 is a block diagram showing in detail the configuration of LCD display color coding/marker color determination processing portion 632.

The processing portion converts input color document image data into color codes for display on the LCD in the color document editing mode.

In the black-and-white document editing mode, the processing portion divides the data produced by thinning the document input data into six kinds of color data (R, G, B, C, Y, M).

Data after 3×3-dot closing processing is used as black data.

The processing portion thins document information at ¼ in the vertical scanning direction, the document image will be stored in the LCD display document memory/closed loop dot marker detection memory for each 4 lines.

Referring to FIG. 16, processing portion 632 includes a determination portion 6323 for LCD display data coding/marker color determination based on input image data, an LCD display data coding/marker color determination processing control portion 6326 for controlling the determination, an output delay synchronizing control portion 6324, a bit 0 selector 6325 to output marker color/LCD display data, a closed loop marker LCD display document memory writing control portion 6327, an ROM table 6321 for LCD display data coding/marker color determination, and an output delay FIFO memory 6322.

Now, a method of determining a marker color and a method of color coding a document will be described.

A marker color is determined by referring to the ROM table using input image data of V, Cr, and Cb thinned at ¼ as ROM addresses. Black-and-white binary data is produced by thinning binary data for display output from the binarizing processing portion at ¼ and output in synchronization with marker color determination data.

Document color coding is performed by referring to the ROM table using input image data of Y, Cr and Cb thinned at ¼ as ROM addresses.

Figure 17:
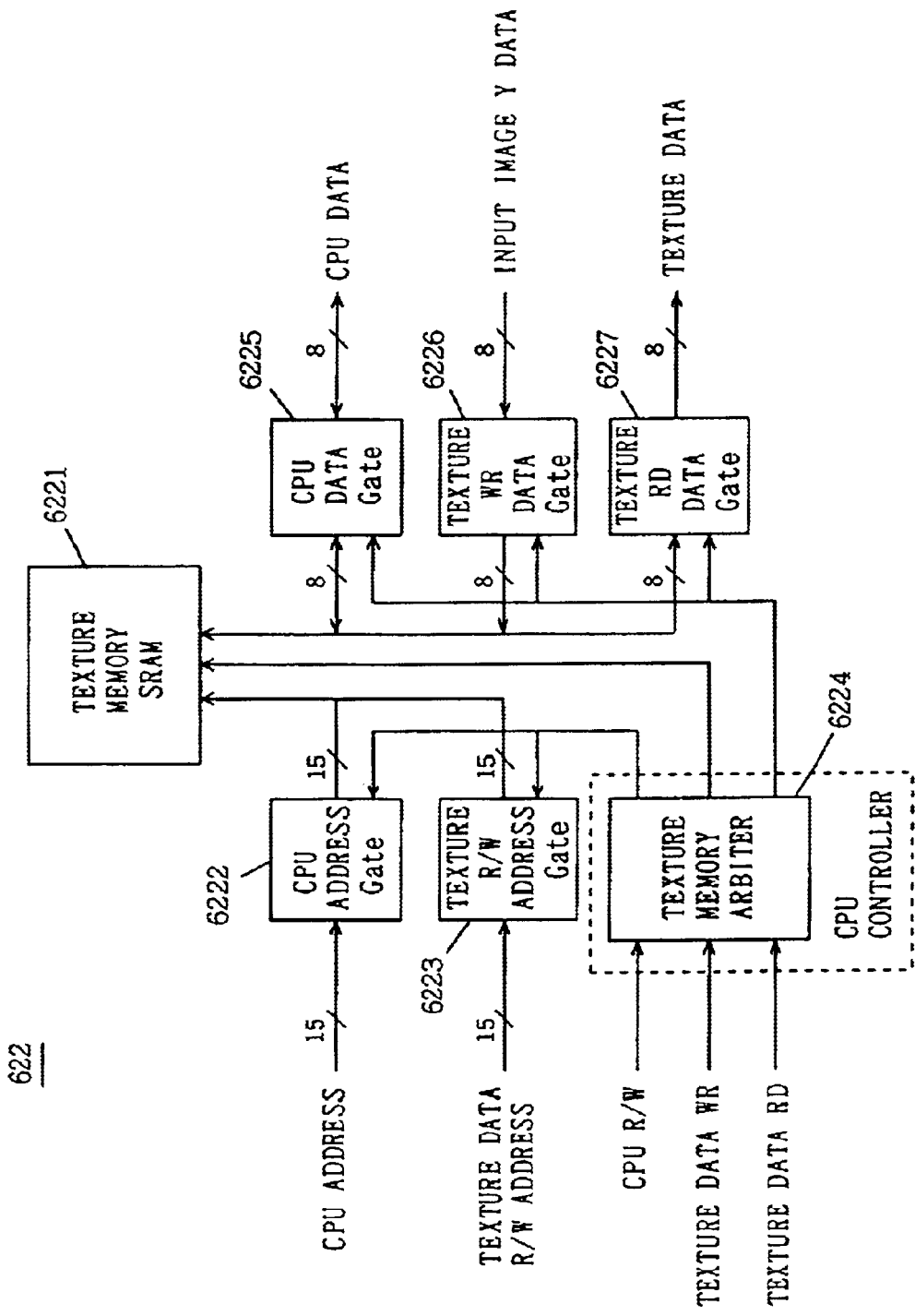
FIG. 17 is a block diagram showing the configuration of a texture memory 622.

FIG. 17 is a block diagram showing in detail the configuration of a texture memory 622.

The memory stores the image of a texture document (a document with a pattern to be registered) placed on the platen glass or parameter data for background gradation. The data stored in the memory is used for a processing of texture patterning of a color document and a processing of writing background gradation. At the maximum cycle of texture patterning, 128 dots are scanned in the horizontal scanning direction, and 256 dots in the vertical scanning direction, and there are 256 steps of gradation. The memory can be accessed by a CPU, a texture data writing portion, and a substitute color data producing portion.

Picture memory 622 includes an SRAM 6221, a CPU address gate 6222, a texture read/write address gate 6223, a texture memory arbiter 6224 included in the CPU controller, a CPU data gate 6225, a texture write data gate 6226, and a texture read data gate 6227.

CPU address gate 6222 receives a CPU address as an input. Texture R/W address gate 6223 receives texture data R/W address as an input. Texture memory arbiter 6224 receives a write/read signal from the CPU, a texture data write signal, and a texture data read signal.

CPU data gate 6225 exchanges data with the CPU. Texture write data gate 6226 receives the Y data of an input image as an input nymph. Texture read data gate 6227 outputs texture data.

Figure 18:
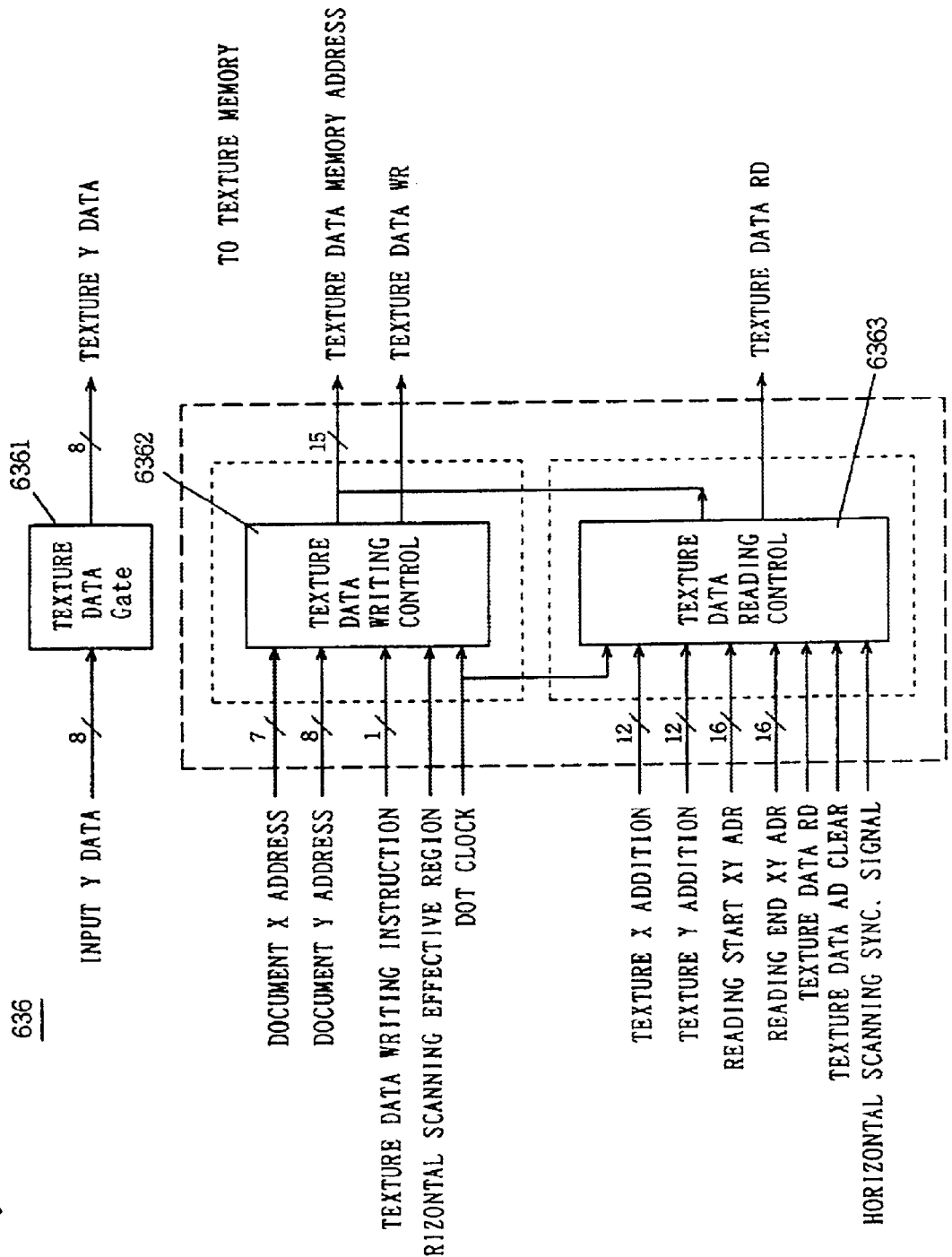
FIG. 18 is a block diagram showing the configuration of a texture data writing portion 636.

FIG. 18 is a block diagram showing in detail the configuration of texture data writing portion 636.

Texture data writing portion 636 makes a control for writing the luminance signal (Y) of a part of an input document (the part corresponding to 128×256 dots and at a position designated by the user) during prescanning texture data into the texture memory.

Texture data writing portion 636 includes a texture data gate 6361, a texture data writing control portion 6362, and a texture data reading control portion 6363. Texture data gate 6361 receives data on input luminance signal (Y) and outputs the Y data of the pattern.

Texture data writing control portion 6362 receives, as inputs, X- and Y-addresses in a document, a texture data writing instruction signal, a horizontal scanning effective region, and a dot clock. Texture data writing control portion 6362 outputs an address in the texture data memory and a texture data write signal.

Texture data reading control portion 6363 receives, as inputs, a texture X addition signal, a texture Y addition signal, reading start XY address, reading end XY address, a texture data read signal, a texture data address clear signal, and a horizontal scanning synchronizing signal. Texture data reading control portion 6363 outputs a pattern data read signal.

Now, a method of producing a texture data writing address will be described. An address for texture data is produced as X, Y addresses including 7 bits in the X-direction and 8 bits in the Y-direction from the position designated for incorporating a document. More specifically, the address for the texture memory is represented as follows:

Texture memory address (A14-0)=(YA7-0, XA6-0).

Now, the timing for permitting texture memory writing will be described. Into the texture data memory, a texture data writing instruction signal and an effective region signal are written in an active period. The data is written in synchronization with a dot clock.

Figure 19:
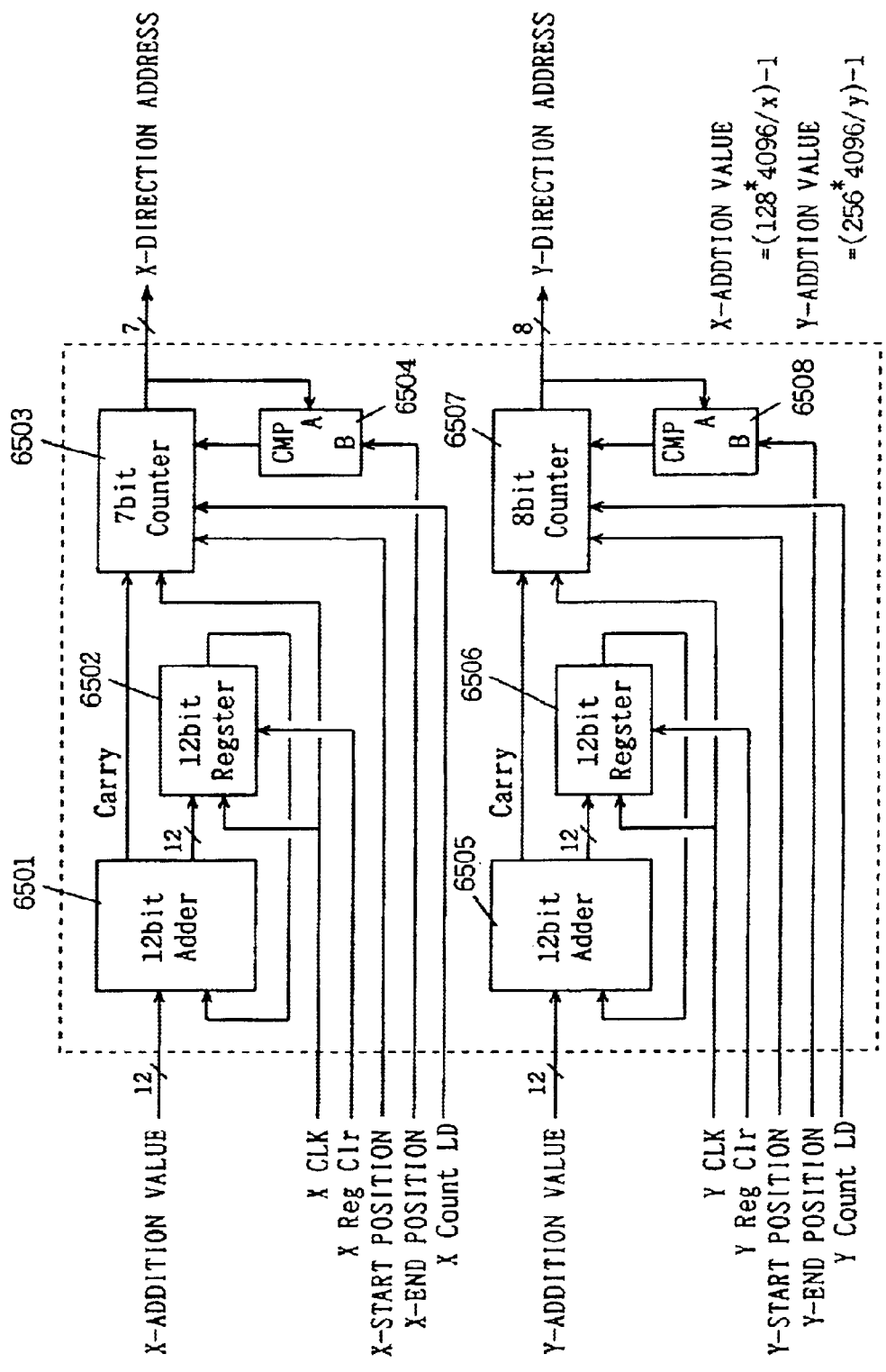
FIG. 19 is a block diagram showing the configuration of a texture memory reading address generation circuit.

FIG. 19 is a block diagram showing the configuration of a texture memory reading address generation circuit.

Referring to FIG. 19, the circuit includes a 12-bit addition circuit 6501, a 12-bit register 6502, a 7-bit counter 6503, a comparison circuit 6504, a 12-bit addition circuit 6505, a 12-bit register 6506, a 1-bit counter 6507, and a comparison circuit 6508.

12-bit addition circuit 6501 receives a value to be added in the X-direction. 12-bit register 6502 receives an X-register clear signal, and an X clock signal. 7-bit counter 6503 receives an X clock, an X-direction start position, and an X count load signal. Comparator 6504 compares the count output of 7 bit counter 6503 and the X-direction end position. 7-bit counter 6503 outputs an address in the X-direction.

For the Y-direction, 12-bit addition circuit 6505, 12-bit register 6506, 8-bit counter 6507, and comparison circuit 6508 similarly operate and output an address in the Y-direction.

A read address for the texture memory is produced as follows in a black-and-white document mode/color document mode.

In the black-and-white document mode, a background gradation processing is performed, and in the color document mode, a texture patterning is performed.

Assume that XA12-0 is the lower 12 bits in the document X-address, YA12-0 is the lower 12 bits in the document Y-address, x is the number of dots in the X-direction in a document/enclosure (x≧128), y is the number of dots in the Y-direction in a document/enclosure (y≧=256), and t is a repeating cycle (256, 512, 1024, 2048). The entire surface/document enclosure address as follows is used.

X-direction address=the lower 7 bits of (128/x)×(XA12-0)
Y-direction address=the lower 8 bits of (256/y)×(YA12-0)
The address for repeating as follows is used.
X-direction address=the lower 7 bits of (128/t)×(XA12-0)
Y-direction address=the lower 8 bits of (256/t)×(YA12-0)

Figure 20:
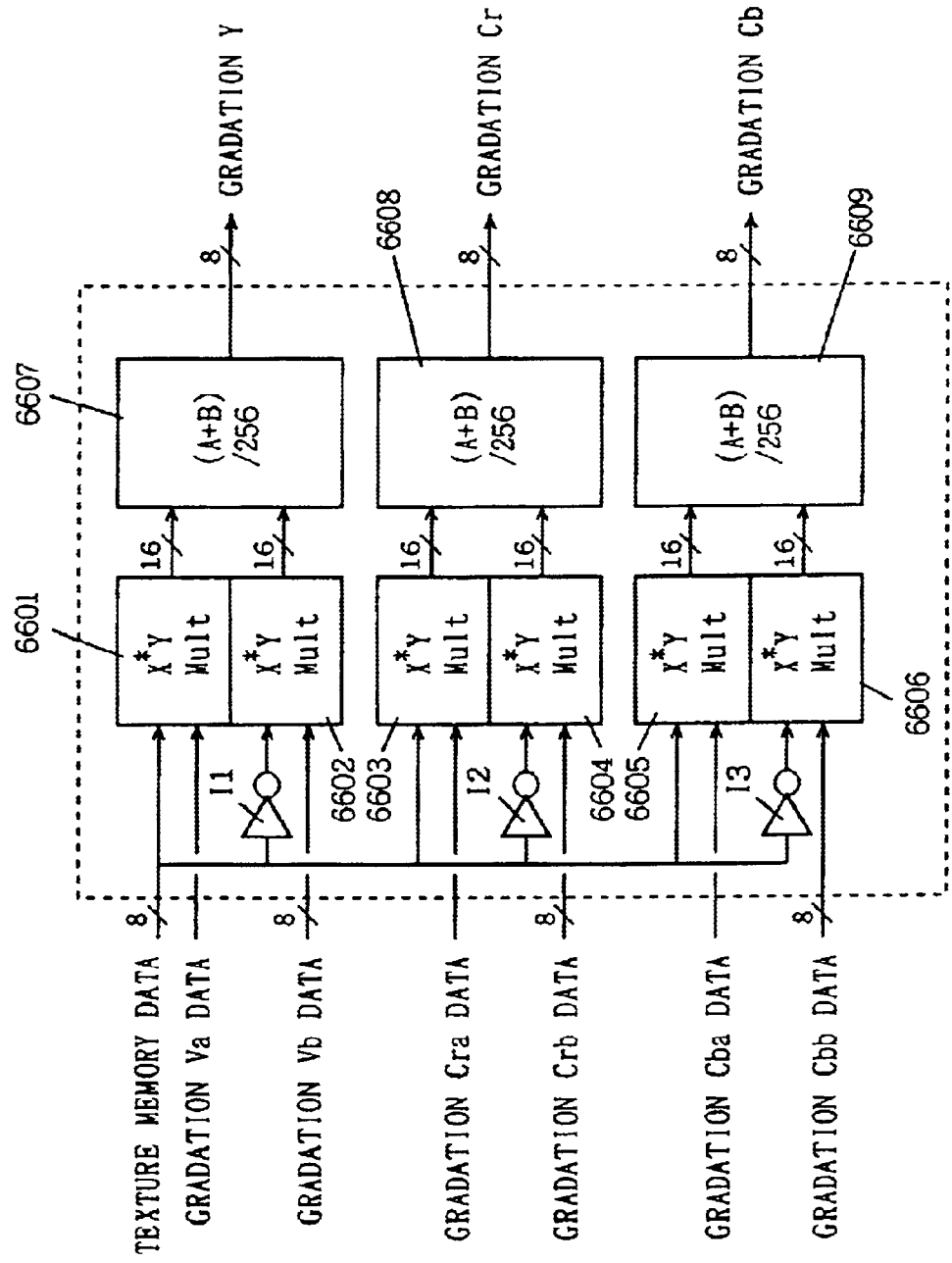
FIG. 20 is a block diagram showing the configuration of a gradation data generation circuit

FIG. 20 is a block diagram showing a circuit for producing background gradation data.

Referring to FIG. 20, the background gradation data producing circuit includes X×Y multipliers 6601 to 6606, calculators 6607 to 6609 for calculating (A+B)/256, and inverters I1 to I3. Texture memory data is input to multipliers 6601, 6603 and 6605. Texture memory data is also input to multipliers 6602, 6604 and 6606 through inverters I1 to I3.

Gradation Va data is input to multiplier 6601. Gradation Vb data is input to multiplier 6602. Gradation Cra data is input to multiplier 6603. Gradation Crb data is input to multiplier 6604. Gradation Cba data is input to multiplier 6605. Gradation Cbb data is input to multiplier 6606.

Calculator 6607 uses the outputs A and B of multipliers 6601 and 6602 for calculation to output gradation Y data.

Calculator 6608 uses the outputs A and B of multipliers 6603 and 6604 for calculation and outputs gradation Cr data.

Multiplier 6609 uses the outputs A and B of multipliers 6605, and 6606 for calculation and outputs gradation Cb data.

Now, the procedure of operating the copying machine shown in FIG. 1 will be described.

Figure 21:
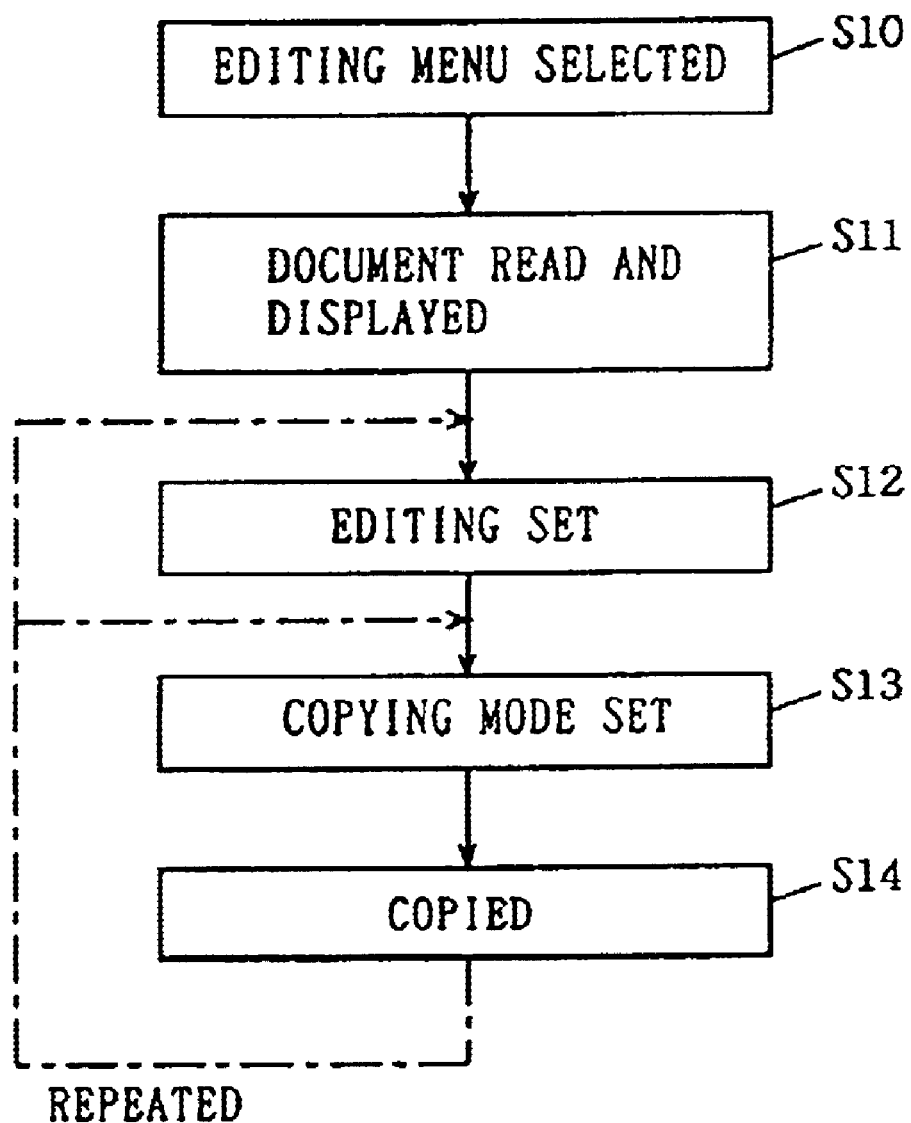
FIG. 21 is a flow chart for use in illustration of the procedure of operating the copying machine shown in FIG. 1.

FIG. 21 is a flow chart for use in illustration of the procedure of operating the copying machine.

Referring to FIG. 21, the operator selects a desired menu among display editing menus (S10). Based on the content of the selected menu, a document is read and the read content is displayed on the screen editor (S11). The operator sets an editing content through the screen editor by viewing the content of the document displayed (S12). Then, a copy mode including the sheet size, the magnification and number of copies is set (S13). Then, an edited copy is output (S14).

Figure 22:
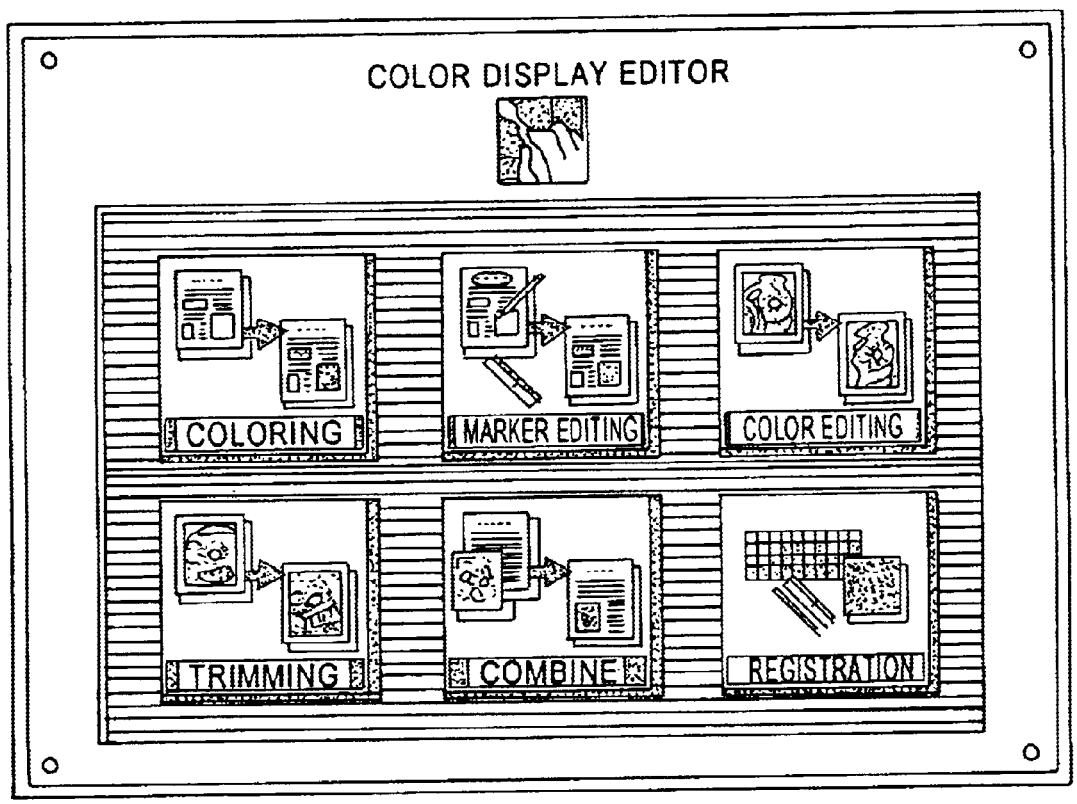
FIG. 22 shows an example of an editing menu.

FIG. 22 is a view showing examples of editing menus. The content shown in FIG. 22 are displayed on the LCD.

The menus include five purpose-specific editing menus, and a single registration menu.

In the coloring editing, characters or the base in a black-and-white document are colored.

In the marker editing, in a black-and-white document having an area designated by the marker pen, the area is colored.

In color editing, in a color document, various color editing processings such as color conversion, monochrome/color filtering are performed. The black-and-white portion of the color document may be colored.

In the trimming editing, part of a color or black-and-white document may be trimmed.

In the combining editing, a color document may be fit in a black-and-white document. In this editing, a black-and-white-document may be colored.

The registration refers to registration of a color palette or patterns as will be described.

Figure 23:
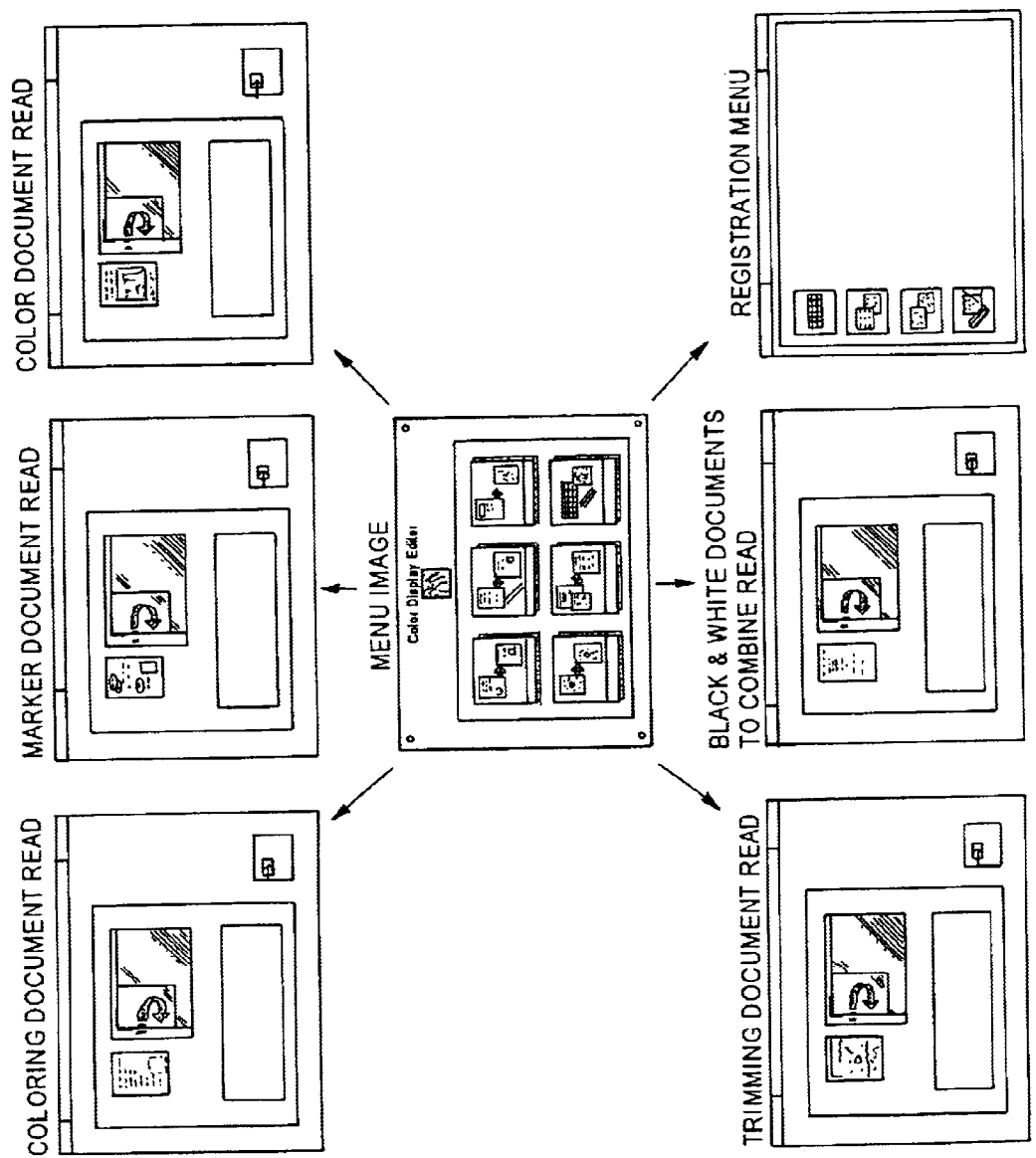
FIG. 23 shows images displayed when an operator presses the buttons in the editing menu.

The user can select a desired editing menu among them through the touch panel. Once a menu is selected, an image corresponding to each content will be displayed as shown in FIG. 23.

Figure 24:
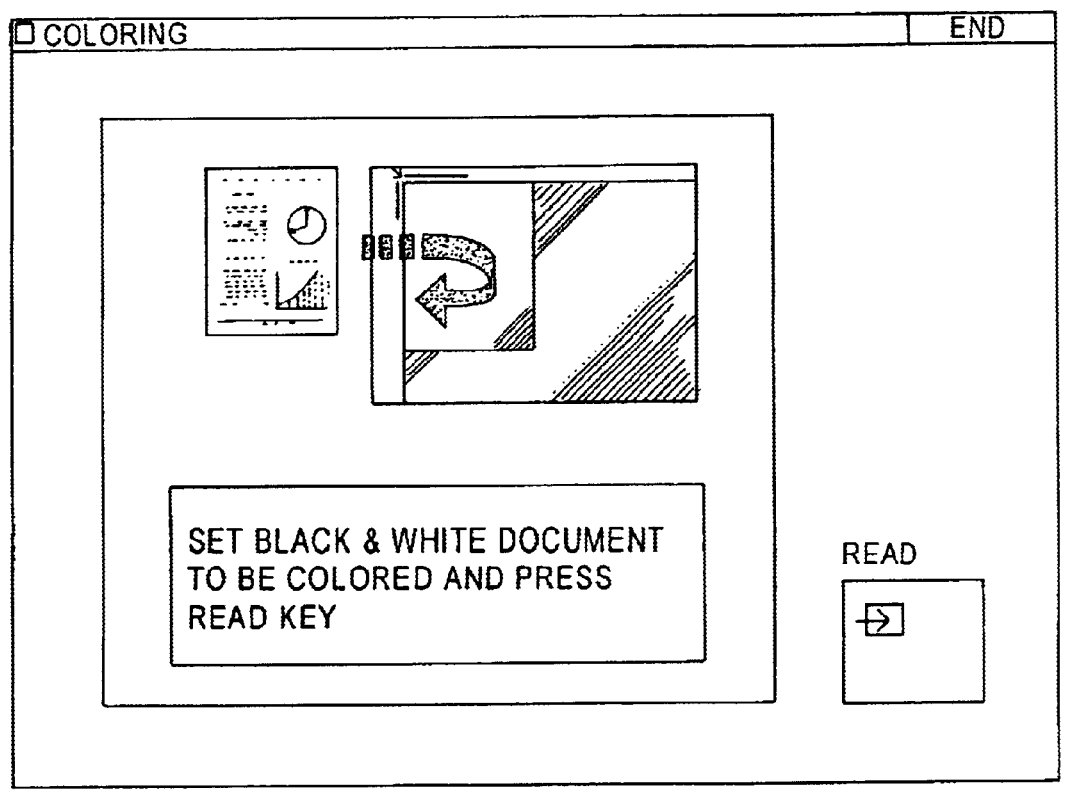
FIG. 24 shows an image displayed when a coloring mode is selected.
Figure 25:
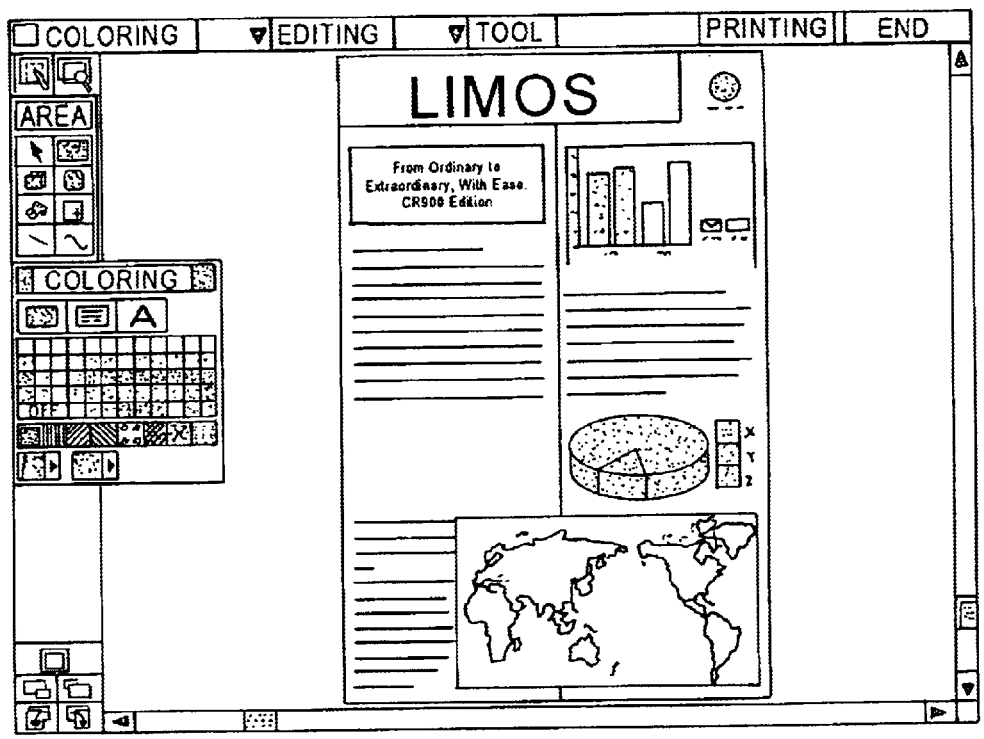
FIG. 25 shows an image displayed during the processing of coloring a black-and-white document.

Now, an image when the coloring editing is selected is shown in FIG. 24. The user sets a black-and-white document to be colored according to the displayed message and presses a read key (lower right in the image). Then, the black-and-white document is read, and the image of the document is displayed on the LCD. In the state, the displayed document image is colored through the touch panel as shown in FIG. 25, and a colored copy is output from the printer.

Figure 26:
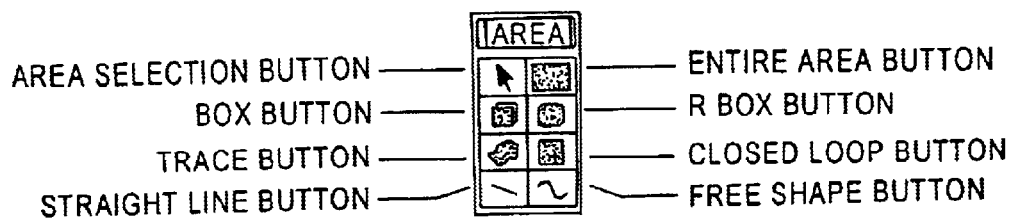
FIG. 26 shows an area designation tool.

In the coloring, an area designation tool as shown in FIG. 26 is used. The area designation tool includes an area select button to select a designated area, an entire document button for the entire document, a box button to designate a rectangular area, an R box button to designate a round rectangular area, a trace button to designate an area in a desired shape, a close loop button to designate an area in a closed loop, a linear button to draw a straight line, and a free shape button to draw a desired shape.

Herein, the box button is a button to designate a rectangle as an area to be colored and the rectangle is defined by two points, the starting point and ending point by dragging the pen.

Figure 27:
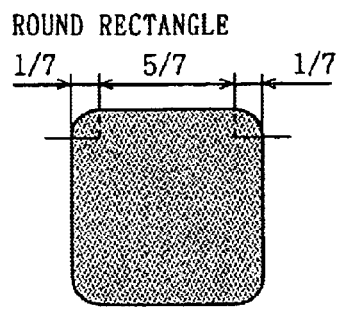
FIG. 27 shows the shape of an R box.

The R box is a button to designate a square with its corners rounded off which is defined by two points, the starting point and ending point by dragging the pen. The round rectangle is shown in FIG. 27.

Figure 28:
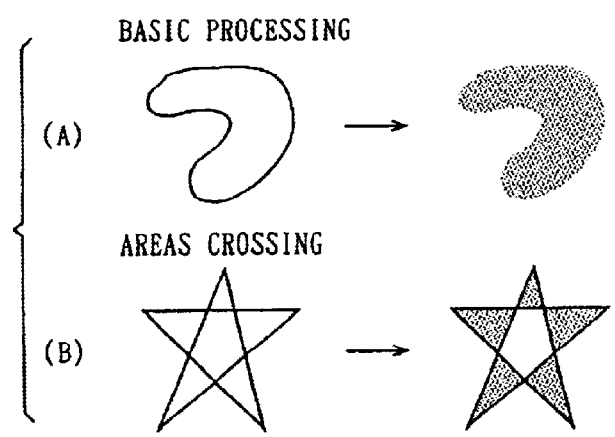
FIG. 28 shows processings by the trace button.

The trace button is a button to designate a closed free shape area with the starting point and ending point designated by dragging the pen. As a basic processing in the area designation by the trace button as shown in FIG. 28 at (A), an area surrounded by a trace line is extracted as a target area. If areas cross each other as shown in FIG. 28 at (A), the crossing area is extracted as a target area. In FIG. 24, the hatched region corresponds to a target area for processing.

The closed loop button is a button to designate an area closed in a black frame around the position input by the pen as a target area. The closed loop area processing proceeds as shown in FIG. 29.

More specifically, as a basic processing, the area surrounded by the black frame is extracted as a closed loop area (FIG. 29(A)). If there is another closed loop in a closed loop, the area surrounded by the outer black frame is extracted as a closed loop area (FIG. 29(B)). The inner closed loop area is not recognized. Thus, closed loops present in alphabet "B" for example is not identified.

Figure 29:
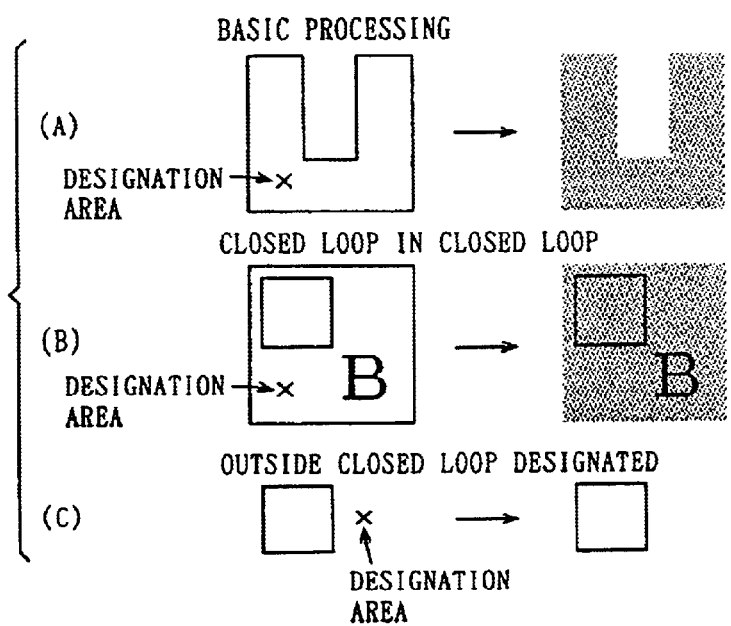
FIG. 29 shows processings by the closed loop button.

If a portion outside the closed loop is designated, the area is not recognized as a closed loop area (FIG. 29 (C)).

Figure 30:
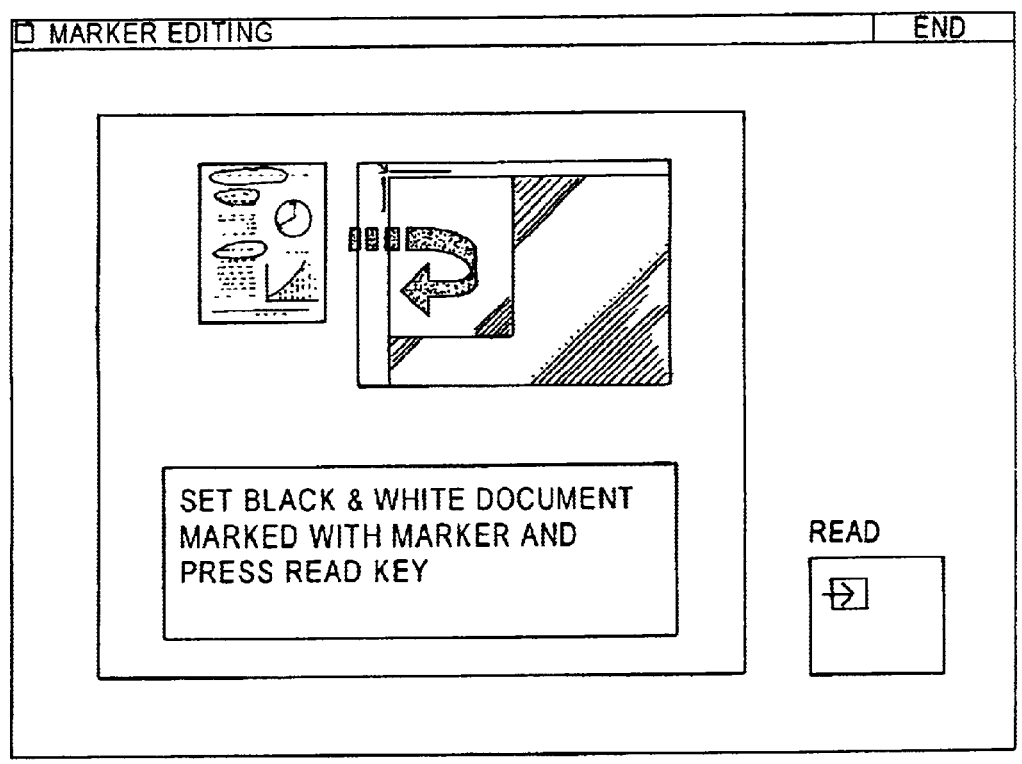
FIG. 30 shows an image displayed in a marker editing mode.

FIG. 30 shows an image when the marker editing mode is designated.

Figure 31:
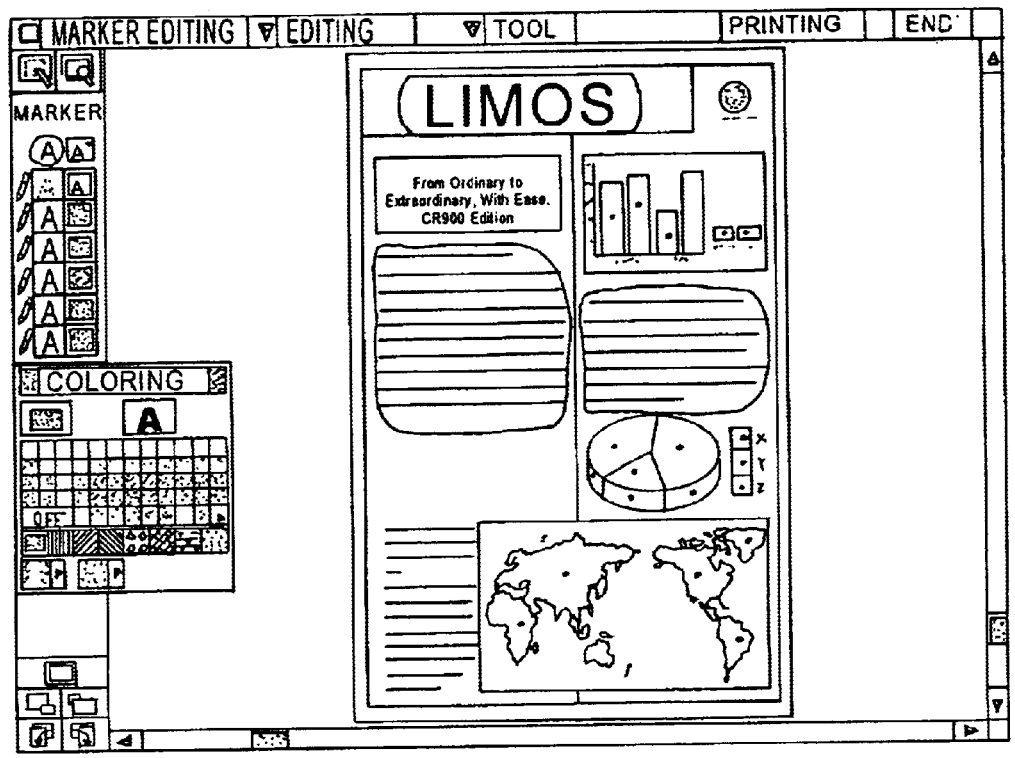
FIG. 31 is an image displayed during marker editing.

Referring to FIG. 30, the operator sets a marker-processed black-and-white document to IR, presses the read key according to the displayed content shown in FIG. 30, and the marker document is read. The read marker document is displayed on the LCD as shown in FIG. 31. The marker designation is made by designating an area desired to be edited with a marker (surrounding frame designation) or by designating an area within a closed loop by marking dots with a marker within a closed loop of the document (dot designation).

Figure 32:
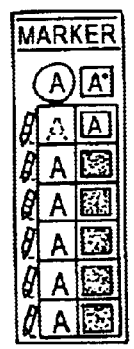
FIG. 32 shows a marker area designation tool.

A further marker area may be designated to a document displayed on the LCD, in which case the marker area designation tool shown in FIG. 32 is used.

The marker area designation tool can designate yellow, magenta, cyan, green, red and blue, and the surrounding frame designation and dot designation can be made for each color.

Figure 33:
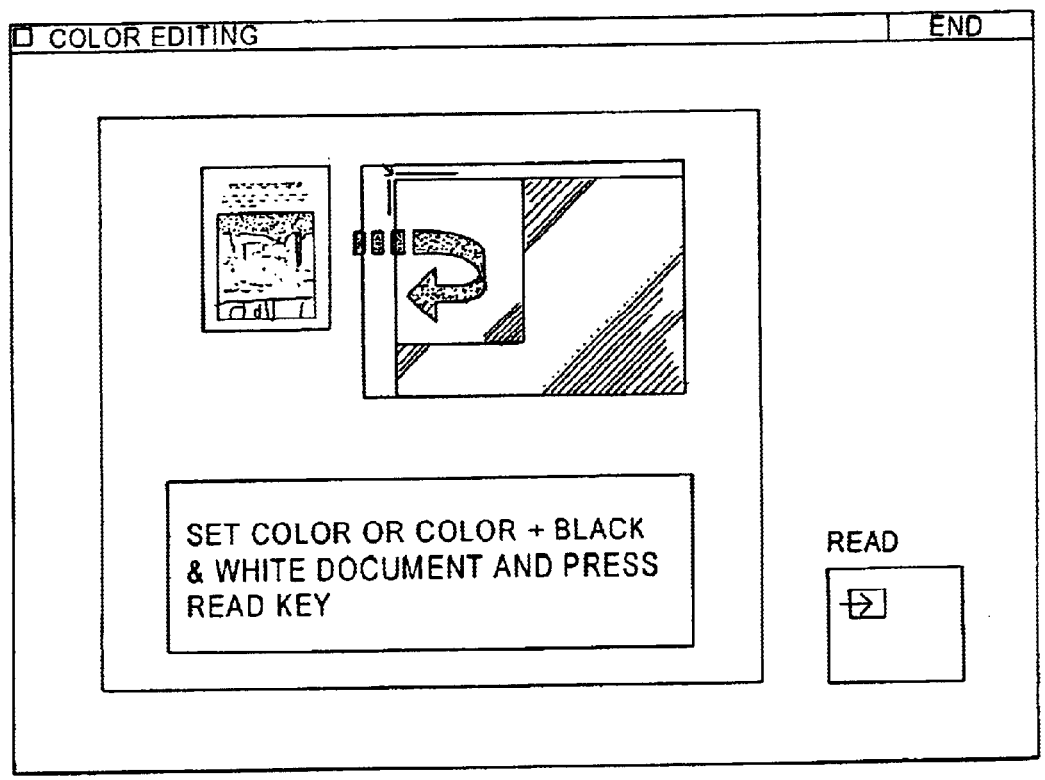
FIG. 33 is an image displayed when a color editing mode is selected.
Figure 34:
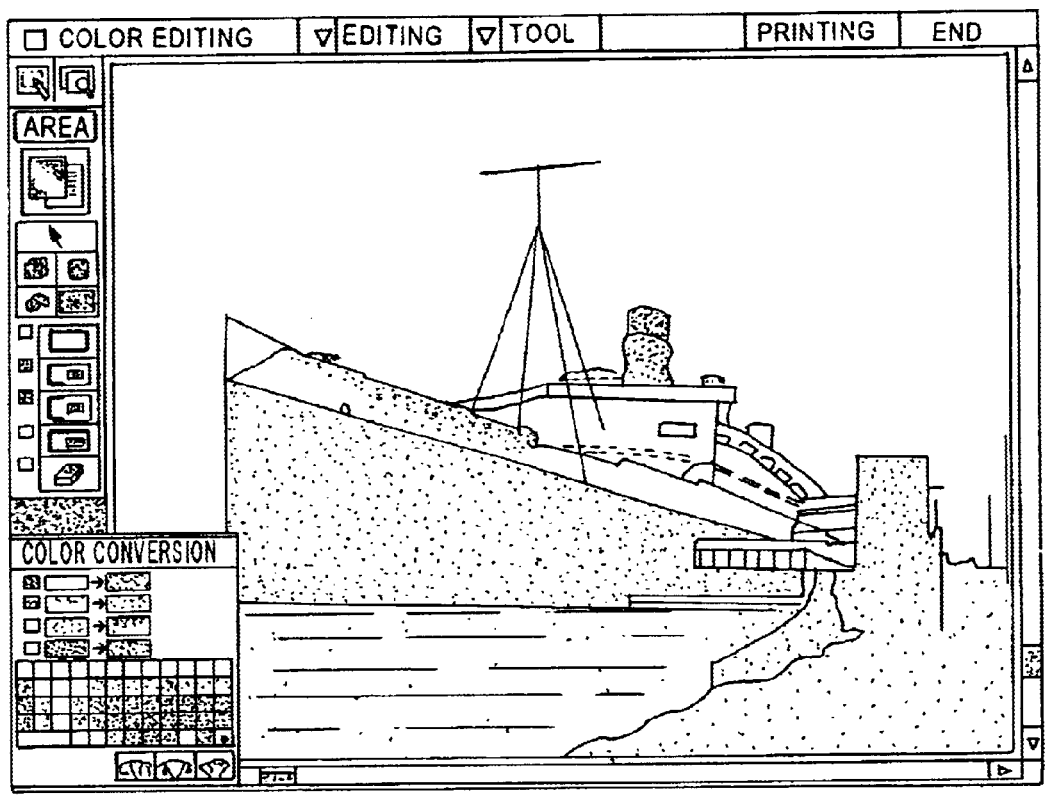
FIG. 34 shows an image read from a color document and displayed.

FIG. 33 shows an image when the color editing mode is designated. The operator sets a color document or a color+ black-and-white mixture document to process at the IR according to the message displayed in the image and presses the read key. Thus, the color document is read, and displayed on the LCD as shown in FIG. 34. The user designates color conversion, for example, through the touch panel to the color document.

Figure 35:
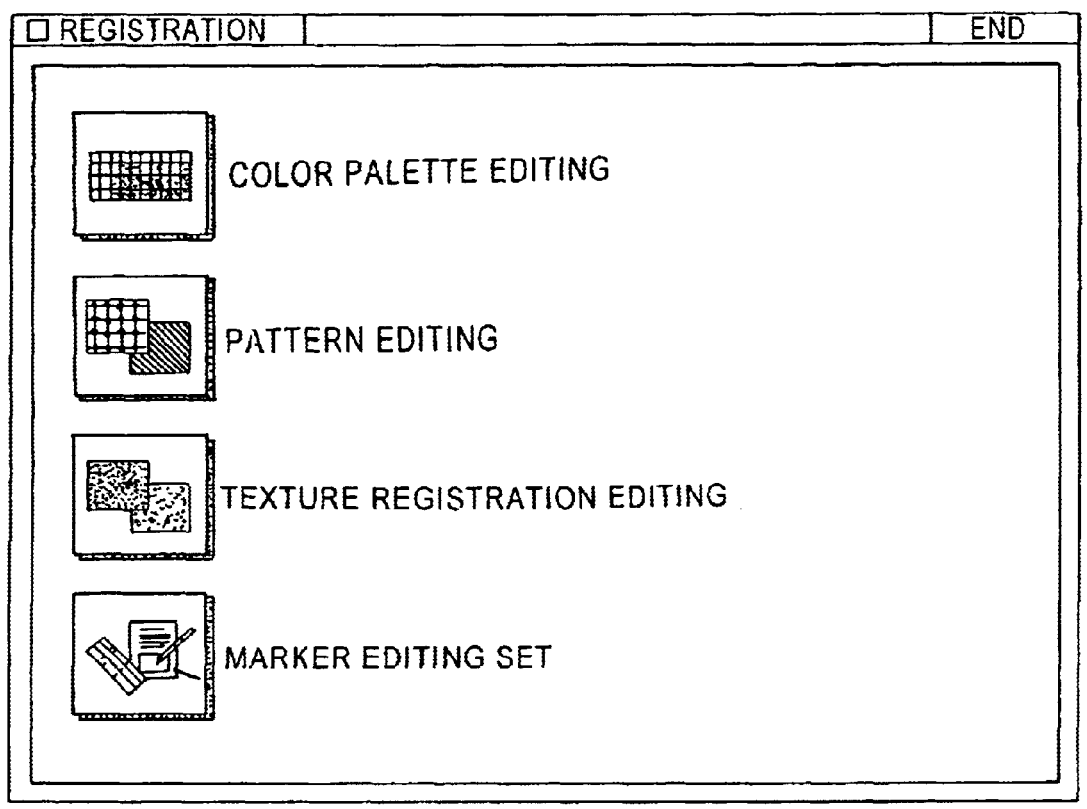
FIG. 35 shows an image displayed when a registration processing is selected.

In FIG. 22, if the registration mode is selected, the image shown in FIG. 35 is displayed on the LCD.

Figure 36:
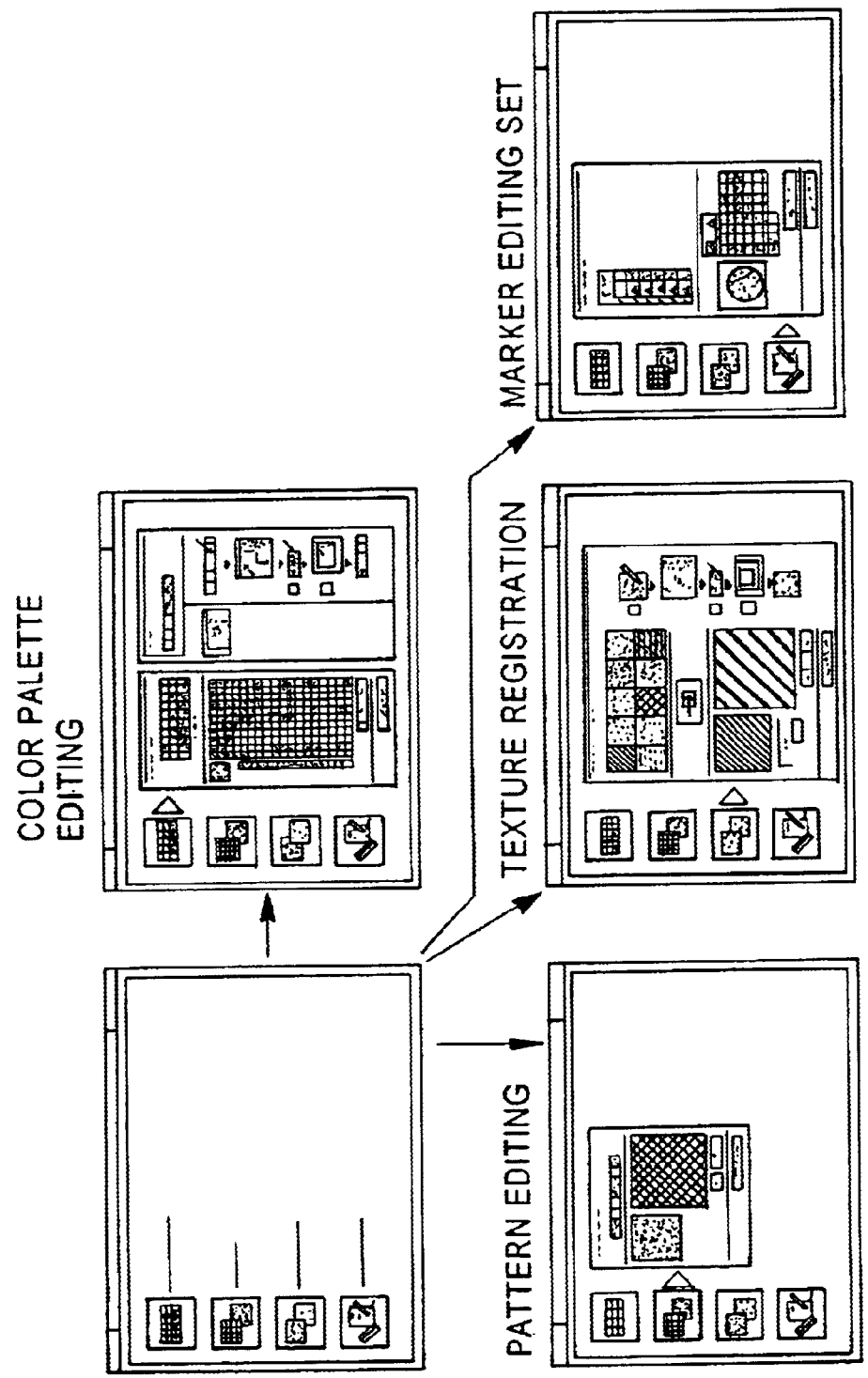
FIG. 36 shows an image displayed after the operator presses the touch panel as the image in FIG. 31 is displayed.

There are four kinds of registration menus. In the color palette editing, colors are registered, the standard color palette, and colors to register are read. In the pattern editing, the pattern editing is made for coloring the background. In the texture registration, the texture pattern is read for registration. In the marker editing setting, a standard (default) editing mode for marker editing is set. As shown in FIG. 36, an image corresponding to the content of each button pressed by the operator is displayed for registration.

Figure 37:
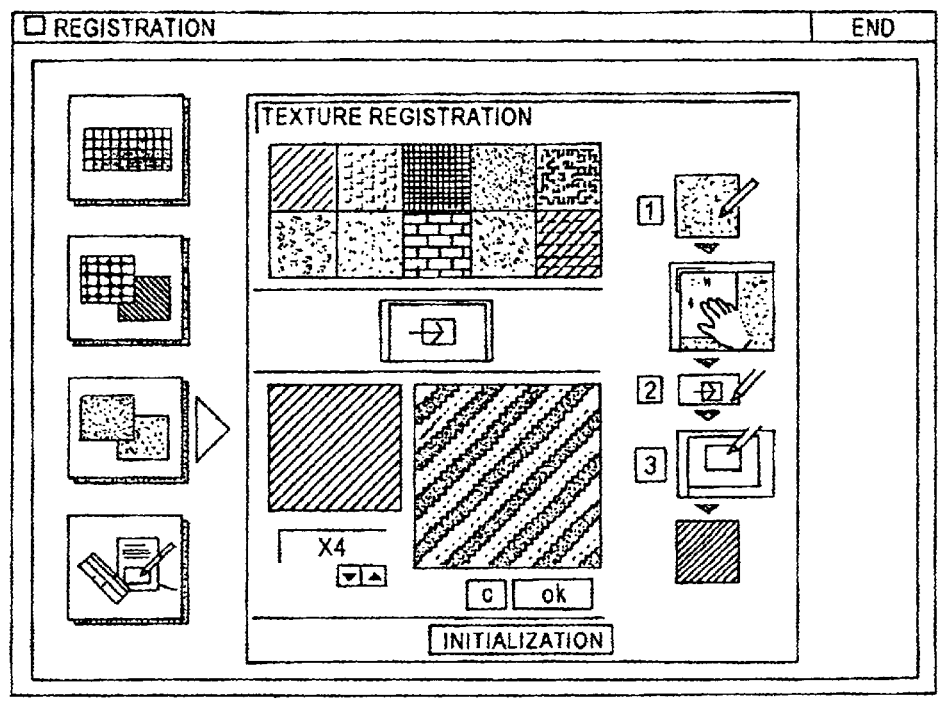
FIG. 37 shows an image displayed when a texture registration is selected in the image shown in FIG. 35.

FIG. 37 shows an image displayed on the LCD when the user selects "texture registration" in the image shown in FIG. 35. As shown, the texture registration tool is displayed.

Figure 38:
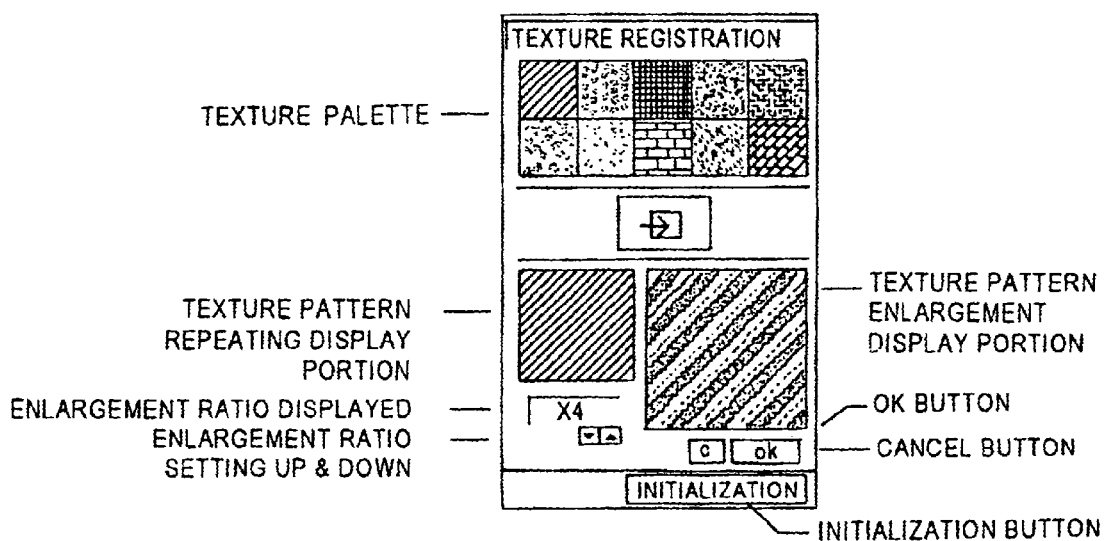
FIG. 38 shows a texture registration tool.

As shown in FIG. 38, the texture registration tool includes a texture pallete, a repeating display portion for texture pattern, an enlargement ratio display portion, an enlargement ratio setting updown key, a texture pattern enlargement display portion, an OK button, a cancel button, and an initialization button.

The texture pallete is used to select a texture to be changed. The texture pattern repeating display portion repeatedly displays a texture pattern. The user can check how the texture will be finished and output by viewing the display portion.

The enlargement ratio setting updown key is used by the user to set an enlargement ratio for a texture pattern (a magnification when output as a copy). The enlargement ratio display portion displays an enlargement ratio for a texture pattern.

The texture pattern enlargement display portion displays an enlarged texture pattern, and includes a cursor inside, and the user can set starting and ending positions for outputting a texture pattern by moving the cursor.

The OK button is used to register a pattern currently set as a texture pattern.

The cancel button is used to interrupt the setting and return to the pattern currently registered in the texture palette. The initialization button is used to initialize all the settings for the texture palette. When the user presses the initialization button, the texture palette returns to the state when the device was packaged and delivered from the factory.

The procedure of operating the texture registration tool is as follows.

As described on the right of the texture registration tool shown in FIG. 37, the user selects a texture to be newly registered (updated) from the texture palette (1), and sets a document with a texture pattern to register is placed on the platen.

Figure 39:
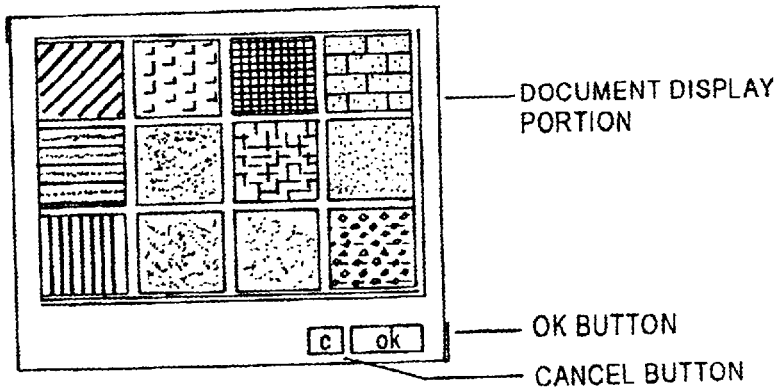
FIG. 39 shows a document reading window.

Then, the user presses the print key (2). Thus, the document image with the texture pattern to register is read. In the LCD, a reading document window shown in FIG. 39 is displayed. The window includes a document display portion to display a read document, an OK button to complete user's position designation, and a cancel button to interrupt setting and once again start operation from reading of the document.

From the document display portion in the displayed read document window, the user designates the sensor position of a texture pattern to register (3). The designated central position is marked with+.

After the designation, when the user presses the OK button, the texture pattern at the designated position is once again read, and the read pattern is displayed at the enlargement display portion and repeating display portion of the texture registration tool.

The enlargement display portion for the texture pattern displays the read pattern as enlarged. The repeating display portion displays the read texture pattern both in the vertical and horizontal directions.

The display by the enlargement display portion permits the user to easily recognize the pattern. By the function of the repeating display portion, the image of actually repeatedly displayed patterns is accessible by the user.

Note that the texture pattern is repeatedly arranged in the both vertical and horizontal directions, but at least two of the patterns may be arranged in any manner if they are arranged in the vertical or horizontal direction.

Figures 44, 45, 46:
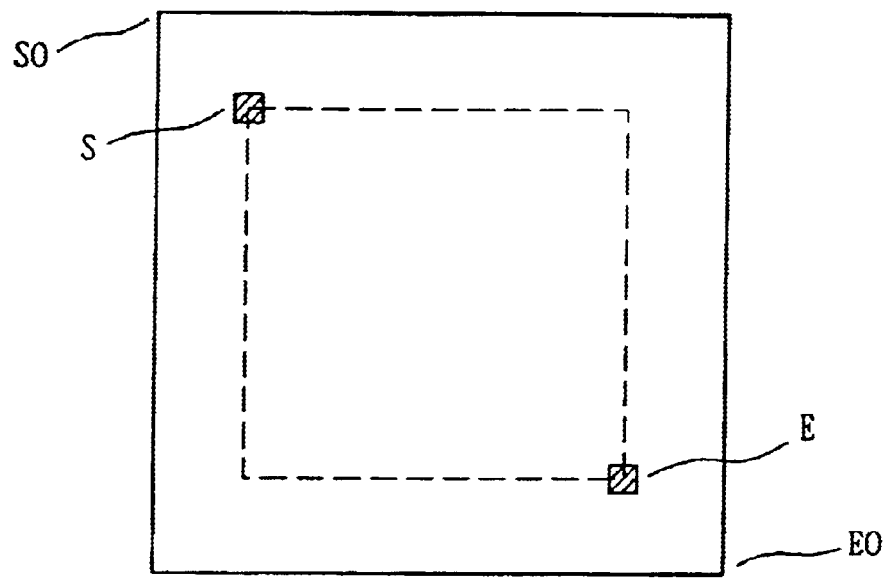
FIG. 44 is a diagram showing a cursor displayed at an expanded display portion.
FIG. 45 shows the arrangement of a texture data reading start position register.
FIG. 46 shows the arrangement of a texture data reading end position register.

As shown in FIG. 44, the enlargement display portion displays start position designation cursor S and end position designation cursor E at the enlargement display portion. The user moves cursors S and E as desired, and can designate the range and size of a pattern to be displayed repeatedly.

Since the repeating pattern within the range designated by cursors S and E is displayed at the repeating pattern display portion as desired, the user can operate the cursors so that the repeated patterns will match a desired image.

If cursors S and E are not used, the start position of a pattern is at the upper left corner S0 of the enlargement display portion, and the end position of the pattern is at lower right corner E0.

Once the operation of start position designation cursor S and end position designation cursor E ends, and the OK button is pressed, a read texture pattern is registered into the texture palette. The positions of cursors are also registered.

The registered texture pattern in the texture palette may be used as desired by the user during editing another document.

Figure 40:
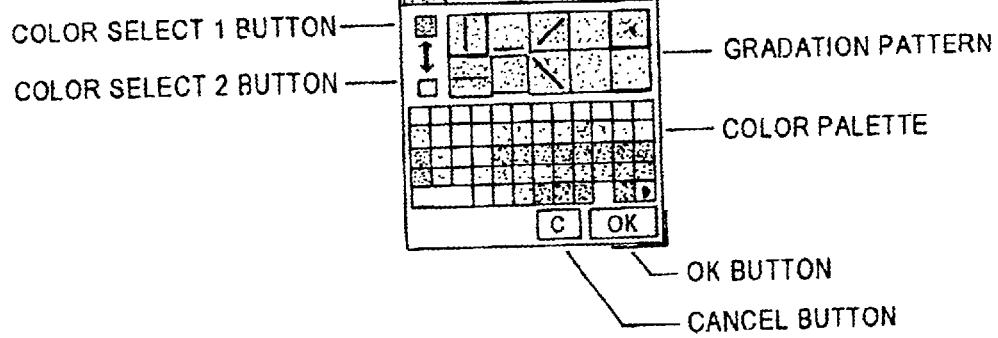
FIG. 40 shows a gradation tool.

FIG. 40 shows the gradation tool.

Referring to FIG. 40, the gradation tool includes a color select 1 button, a color select 2 button, a gradation pattern, a color pallete, an OK button, and a cancel button.

Color select 1 button is used to select a first color for gradation. When the button is pressed, the first color for gradation in the color palette is selected.

Color select 2 button is used to select a second color for gradation. When the button is pressed, the second color for gradation can be selected by the color palette.

The gradation pattern has 10 kinds of patterns. The user can select a desired pattern among them. The color in the gradation pattern may be changed for display depending upon the setting state of colors by color select 1 and 2 buttons.

The color pallete is used to select first and second colors for gradation from 53 standard colors. By pressing the (>) button shown at the lower right corner, the enlarged palette is displayed.

The OK button is used to end the setting, and the cancel button is used to interrupt the setting.

The gradation tool may be called in the editing image as shown in FIGS. 25 and 31. By setting, a gradation pattern may be written as a background for a black-and-white document.

Figure 41:
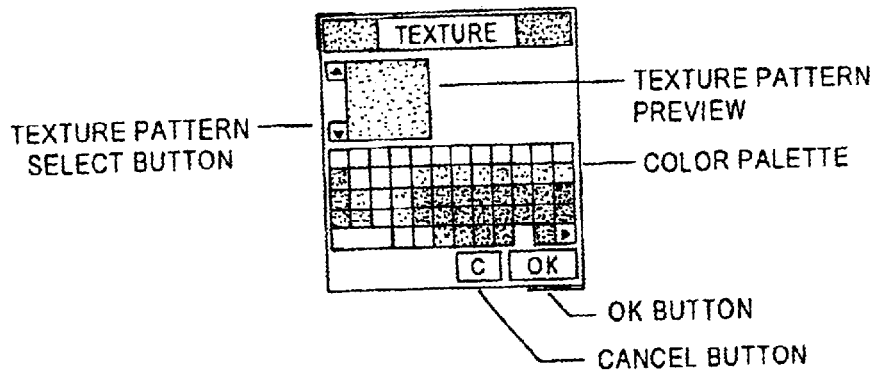
FIG. 41 shows a texture tool.

FIG. 41 shows the texture tool.

Referring to FIG. 41, the texture tool includes a texture pattern select button, a color palette, a texture pattern preview image, an OK button, and a cancel button.

The texture pattern select button includes an up key and a down key. The user can select a desired pattern from the 10 kinds of texture patterns using the up and down keys.

The color palette is used to select a color for a pattern from the 53 standard colors. By pressing (>) button at the lower right corner, the enlarged palette is displayed.

The texture pattern preview image is used to preview a selected texture pattern.

The OK button is used to end a setting, and the cancel button is used to interrupt a setting.

The texture tool is displayed by turning on the texture key of the coloring tool (displayed at the left end in the center in the image) shown in the image in FIG. 25 or 31. The texture key is a key on the right side among the two keys displayed at the lowermost position of the coloring tool.

Now, the flow of signals during texture registration will be described.

Referring to FIG. 3, when a mode menu is selected on the display editor, a desired button in the touch panel is pressed, the coordinates of the pressed portion on the touch panel and a command signal are sent from touch panel 614 through CPU controller 610 to a program ROM 604, a work RAM 606, a backup SRAM 608, and a CPU 602. Thus, data signals are transmitted to LCD controller 612 from the program ROM, the work RAM and the backup SRAM through CPU 602, and the content displayed by color LCD 115 is controlled.

When the user selects a texture to be changed from the texture pallete during texture registration, and presses the document read start button through touch panel 614, a command signal is transmitted to CPU 602 through CPU controller 610. The command signal is also transmitted through the processing portion 102 of the copying machine main body through a serial port. Thus, prescanning is performed and a document with a texture is read.

The read image data is transmitted to and processed by ¼ thinning processing portion 634, LCD display color coding·marker color determination processing portion 632, and closed loop/marker detection/LCD display document memory 620. The image data is stored in VRAM 616 through CPU 602 and LCD controller 612. Thus, the LCD controller controls the content displayed on LCD 115, and the entire read document is displayed.

The read document is displayed on LCD 115. The user designates a point in the center of a pattern he/she wishes to register through touch panel 614. The coordinates of the point and a command signal are sent to CPU controller 610. The coordinates of the point and a command signal are sent to CPU controller 610. The coordinate data signal is transmitted to texture data register 613 (also called texture data incorporation position register). The command signal is transmitted to copying machine processing portion 102 through CPU 602, and the desired area is once again prescanned.

The coordinate data signal is transmitted to texture data writing portion 636 from texture data register 613, and the image data signal is transmitted to texture data writing portion 636 from copying machine processing portion 102. Texture data writing portion 636 stores and registers the image data in texture memory 622. The image data is sent to LCD controller 621 through CPU 602 and stored in VRAM 616. The image data stored in VRAM 616 is read by LCD controller 612 and displayed on LCD 115. At the time, the pattern image is enlarged and displayed in a repeated manner.

During setting the start and end positions for a texture registration pattern using the cursors, the signals flow similarly as above.

When a texture pattern is output, a command signal from touch panel 614 is transmitted to CPU 602 through CPU controller 610 during setting a pattern. The command signal is then send to copying machine processing portion 102 through the serial port, and the texture pattern is output. CPU controller 610 transmits a command signal to texture memory 622 and substitute color data producing portion 640. Thus, a texture reading data is transmitted from texture memory 622 to substitute color data producing portion 640. A color data signal is transmitted to copying machine processing portion 102, subjected to image processing, and a texture pattern is actually output.

Now, pattern registration by designating a point during the texture registration will be further described.

Figure 42:
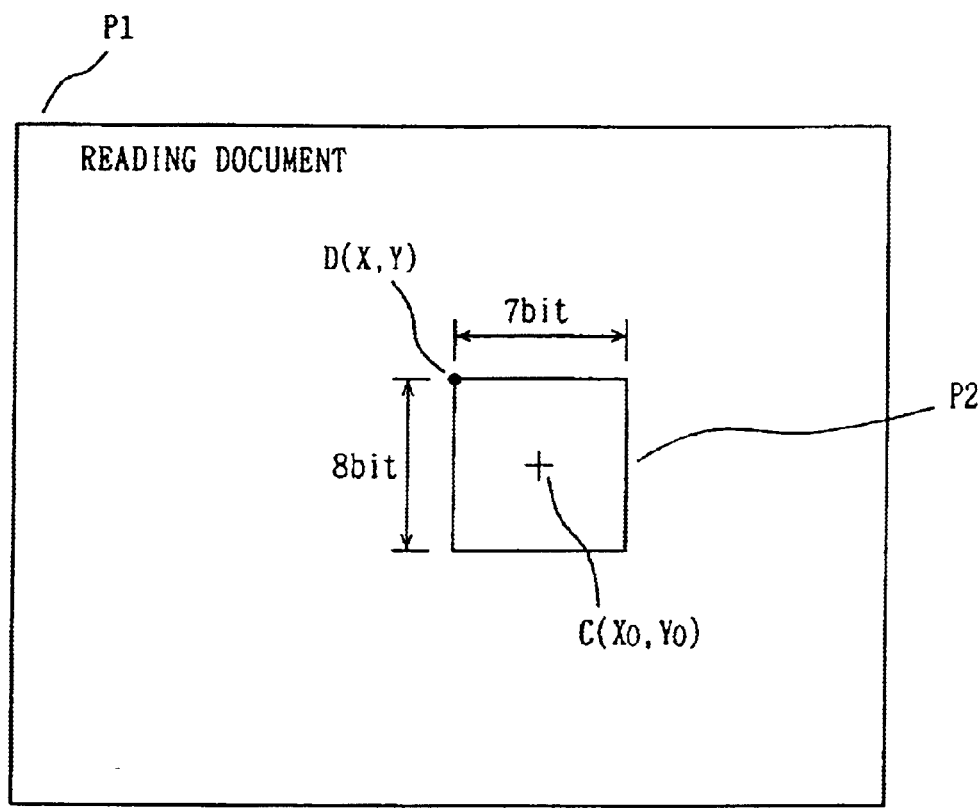
FIG. 42 is a diagram for illustrating the relation between a read document and a point designated in the document.

Referring to FIG. 42, a document is prescanned, and an image P1 of the read document is displayed on the LCD. The user designates a point on the display. If an image input by the point designation is C (X0, Y0), an incorporation position P2 is set by the texture data incorporation position register based on the coordinate data. A texture pattern to be registered is produced by addresses of 7 bits in the X-direction and 8 bits in the Y-direction, and therefore D (X, Y), the position produced by subtracting 4 bits both in the X- and Y-directions from the addresses at point C designated on the editor is stored in the texture data incorporation position register.

Figure 43:
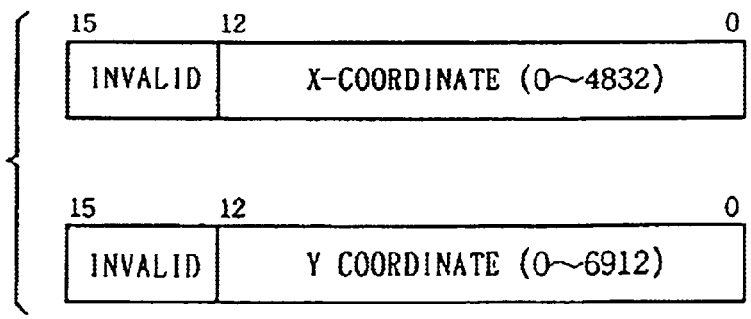
FIG. 43 shows the arrangement of texture data incorporating position register.

FIG. 43 shows the arrangement of the texture data incorporation position register.

Referring to FIG. 43, the register is divided into a register to store X-coordinates, and a register to store Y-coordinates. These registers are both formed of 16bits, bit 0 to bit 15. Bits 0 to 12 are used for storing coordinates, and bits 13 to 15 are not used. The register to store X-coordinates store coordinate data corresponding to any of 0 to 4832, and the register to store Y coordinates store data corresponding to any of 0 to 6912.

When data is stored by the register, incorporation position P2 on the document is once again prescanned. The texture data writing portion produces an address of 7 bits in the X-direction and 8 bits in the Y-direction from the position indicated by the register. Thus, the texture data is written into the texture data memory.

By the above-described operation, a desired position of a texture pattern is registered into the memory by point designation.

Image data of 7 bits in the horizontal direction and 8 bit in the vertical direction which has been written is displayed enlarged as shown in FIG. 44 at the enlargement display portion. A pattern within a pattern start/end position designation frame formed of start position designation cursor S and end position designation cursor E displayed at the enlargement display portion is registered into the device as a figure to be repeated. The starting position of reading pattern data is stored in the texture data reading start position register by the coordinates of cursor S.

FIG. 45 shows the arrangement of the texture data reading start position register. Referring to FIG. 45, the register is formed of 16 bits, bits 0 to 15. Bits 0 to 7 store the starting position in the X-direction. Bits 8 to store the starting position in the Y-direction. A value of 0 to 127 is stored as the starting position in the X-direction, and a value of 0 to 255 is stored as the starting position in the Y-direction.

Similarly, the position of ending reading indicated by cursor E is stored by texture data reading ending position register shown in FIG. 46. The texture data reading ending position register has a substantially identical configuration to the start position register as shown in FIG. 45.

Figures 47, 48:
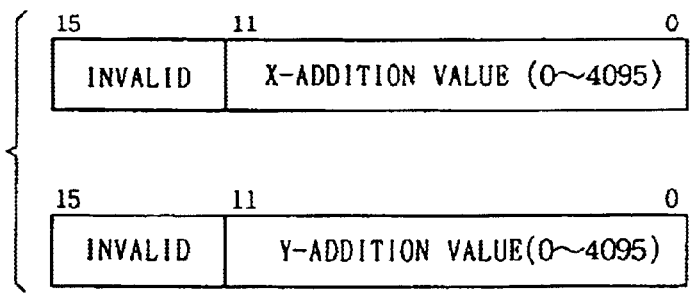
FIG. 47 is a diagram for use in illustration of a processing of outputting a texture pattern.
FIG. 48 shows the arrangement of texture data X, Y addition value registers.

These registers permit a range to repeatedly output to be set. An image of repeated patterns is formed, as shown in FIG. 47, a unit pattern is repeated in both vertical and horizontal directions. From the starting positions for X and Y, addresses are produced by incrementing value, and the values are cleared the moment the ending positions for X, Y are reached. The same operation is repeated from that point, and addresses in the X-direction and Y-directions are produced. Repeated patterns are formed based on thus read addresses.

When repeated patterns are formed, the texture data X, Y addition value registers shown in FIG. 48 are used. The texture data X, Y addition value registers set an addition value to a read address during editing texture data by the CPU.

The data of texture data X, Y addition value registers is set to a value produced according to the following expressions within a value in the range of the texture region for X and Y.

$$X \text{ addition value}=(128\times4096/x)-1$$

$$Y \text{ addition value}=(256\times4096/y)-1$$

wherein x is the range of a texture region or a texture repeating cycle in the X-direction, and y is the range of a texture region or a texture repeating cycle in the Y-direction.

Now, the effects brought about by the copying machine according to this embodiment will be detailed.

Figure 49:
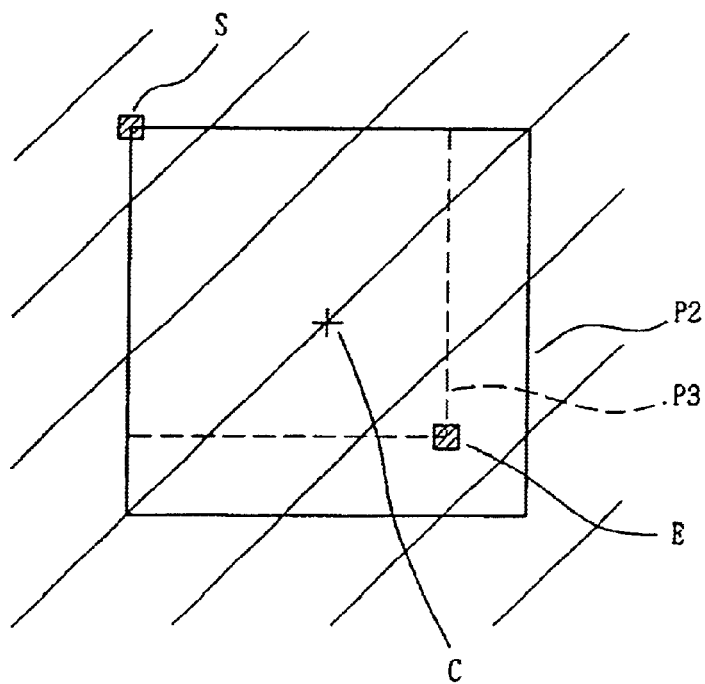
FIG. 49 is a diagram for use in illustration of an advantage of a copying machine shown in FIG. 1.
Figure 55:
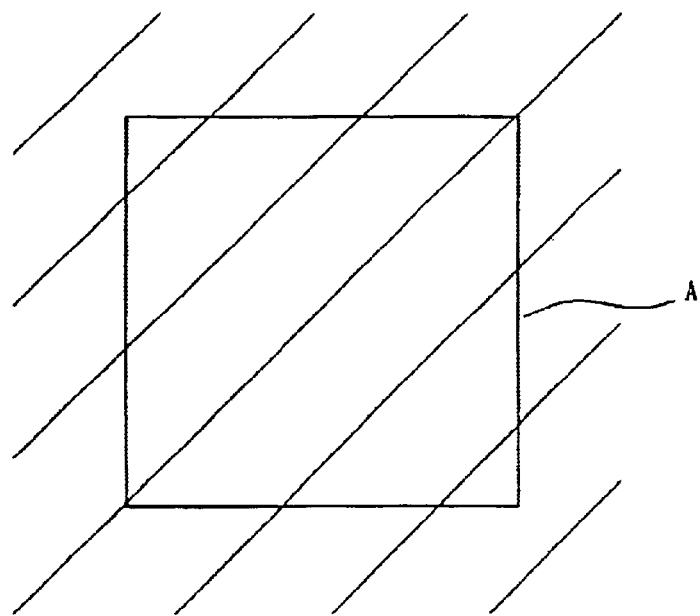
FIG. 55 is a diagram for use in illustration of a problem associated with a conventional technique.

FIG. 49 is a diagram for use in illustration of a pattern to be incorporated and a range in which the pattern is registered in the device. FIG. 49 corresponds to FIG. 55.

Figure 56:
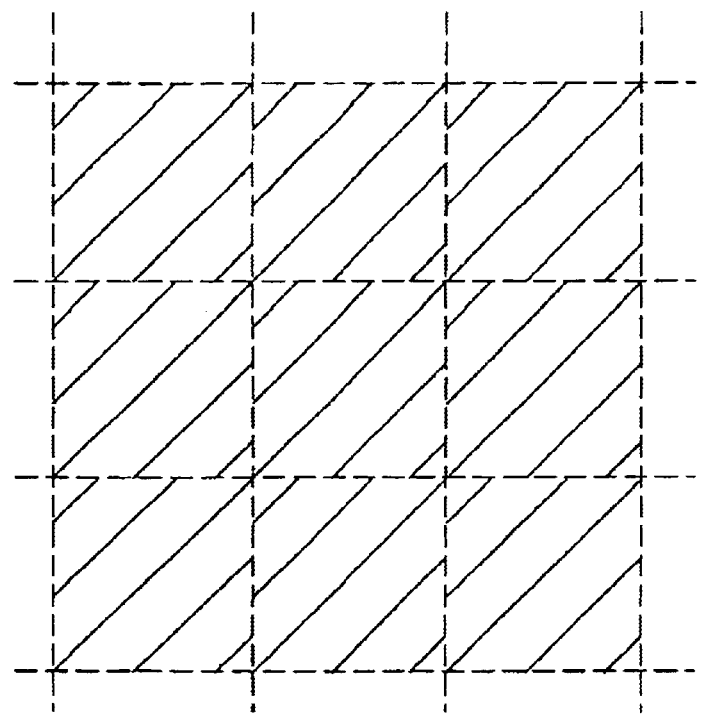
FIG. 56 is a diagram for use in illustration of the problem associated with the conventional technique.

Referring to FIG. 49, when a pattern formed of oblique lines is registered, a read document is displayed on the LCD. The user designates the central position C of a pattern he/she wishes to incorporate by the touch panel. An area P2 defined by a range of horizontal 7 bits and vertical 8 bits is displayed by the enlargement display portion for the texture pattern. The repeating display portion for the texture pattern displays a repeating pattern. Here, when area P2 is selected, a pattern different from the image of the original is output at the repeating pattern display position as in FIG. 56. Referring to the pattern, the user limits the unit of the repeating pattern using cursors S and E. As the positions of cursors S and E change, a pattern within the range designated by the cursors is displayed in a repeated manner by the repeating pattern display portion.

When a pattern corresponding to the image desired by the user is displayed by the repeating pattern display portion, the user presses the OK key.

Figure 50:
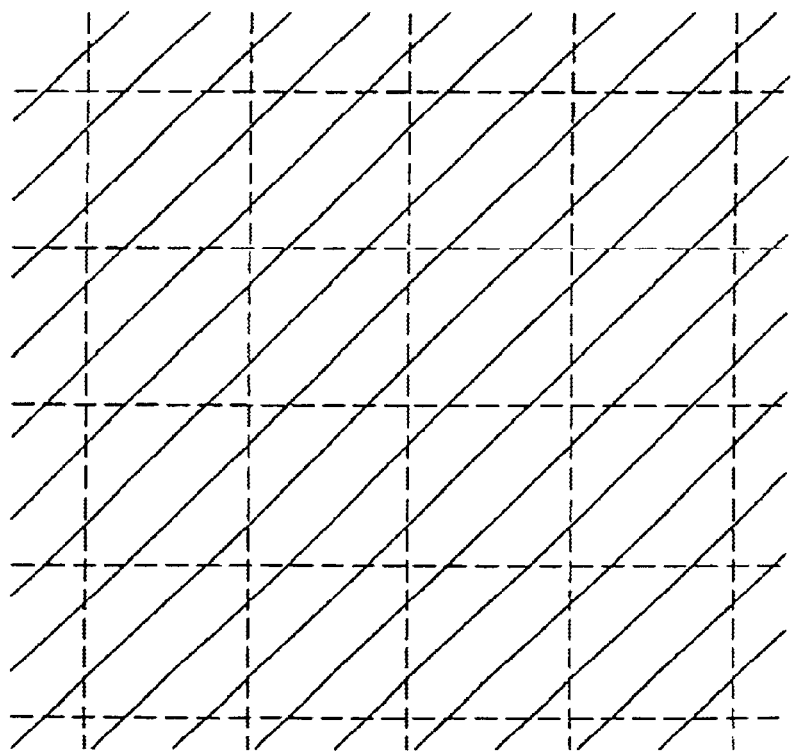
FIG. 50 is a diagram for use in illustration of another advantage of the copying machine shown in FIG. 1.
Figure 51:
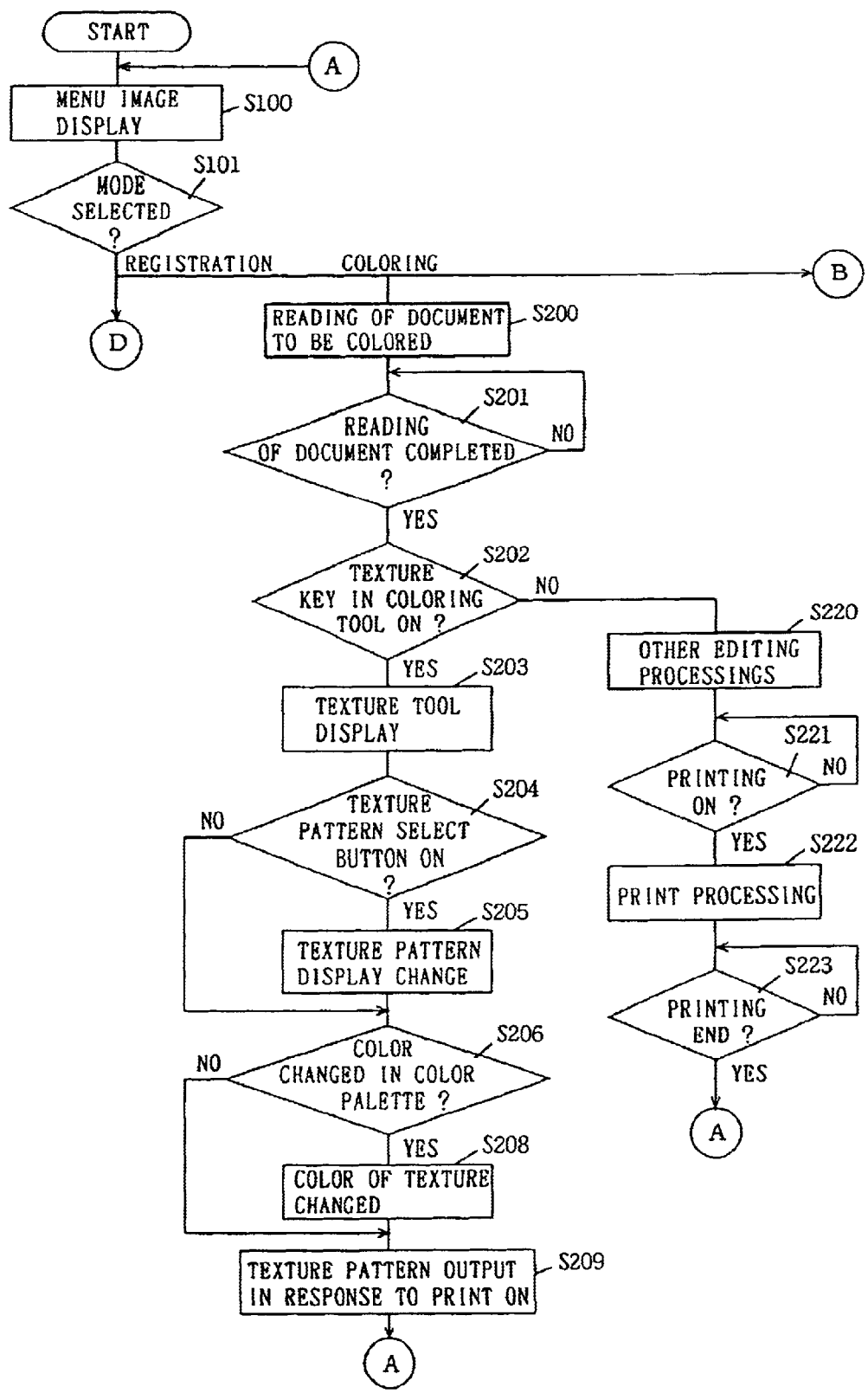
FIG. 51 is a flow chart for use in illustration of a processing by the copying machine shown in FIG. 1.
Figure 52:
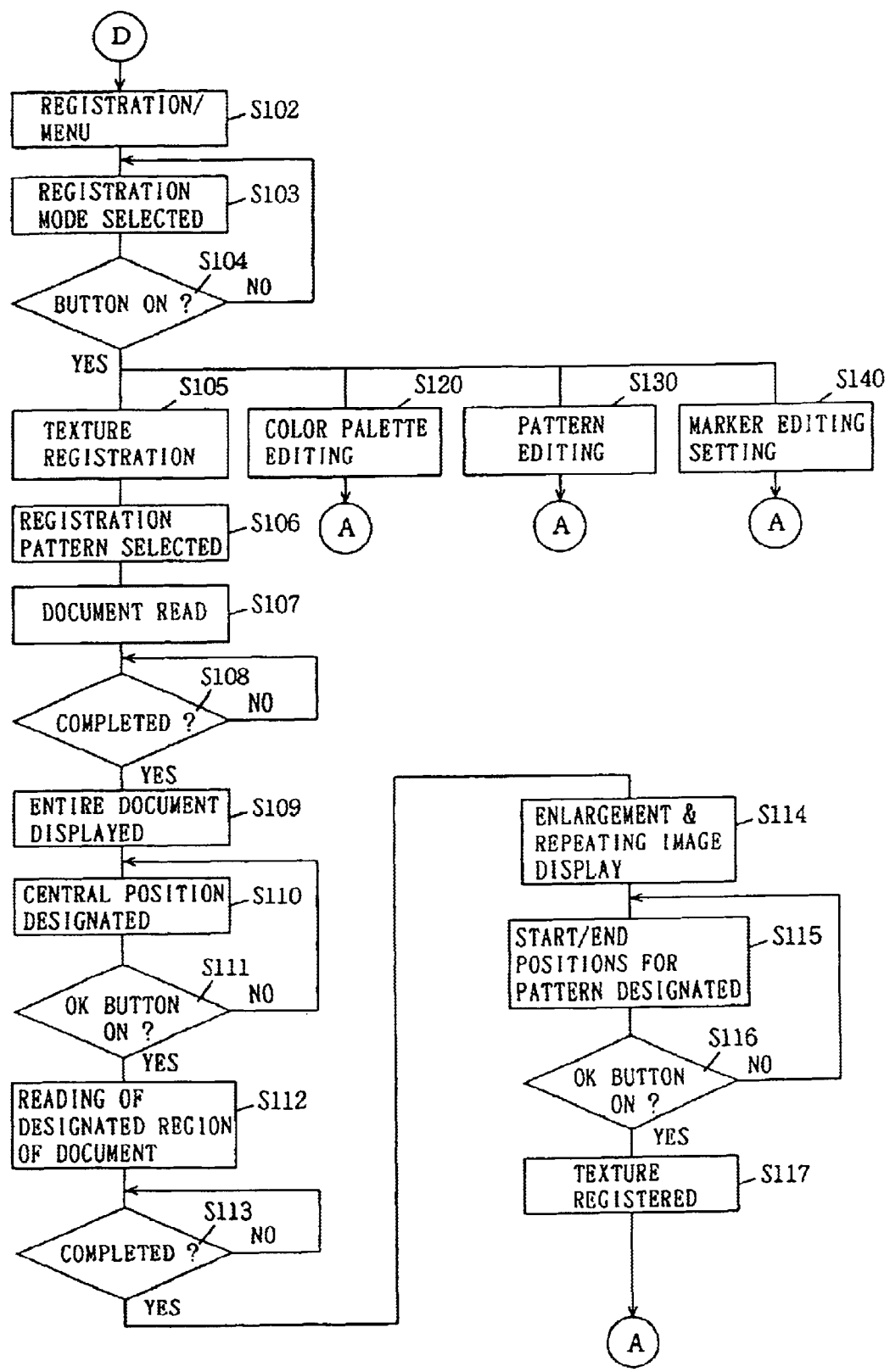
FIG. 52 is the continuation of the flow chart shown in FIG. 51.
Figure 53:
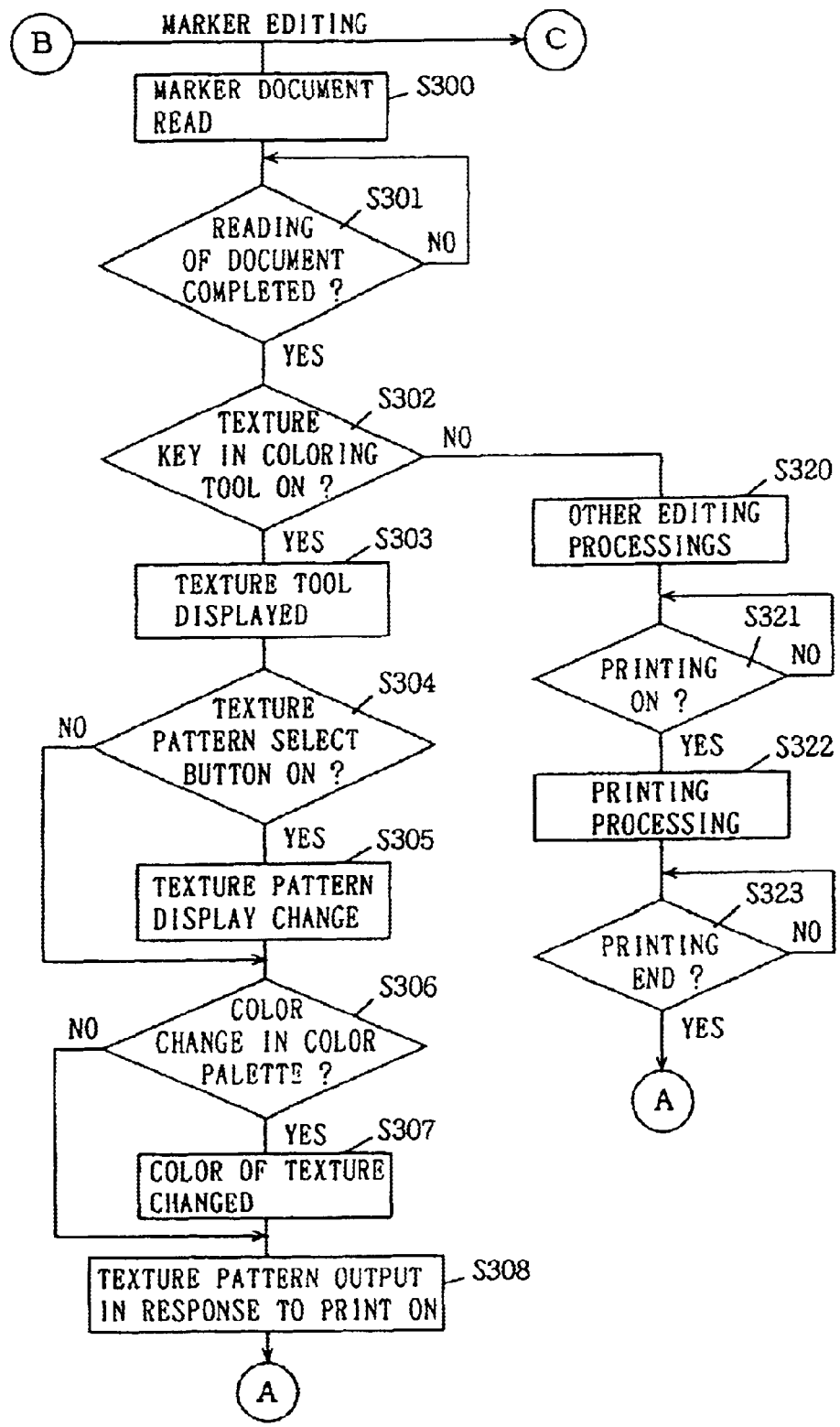
FIG. 53 is the continuation of the flow chart shown in FIG. 51.
Figure 54:
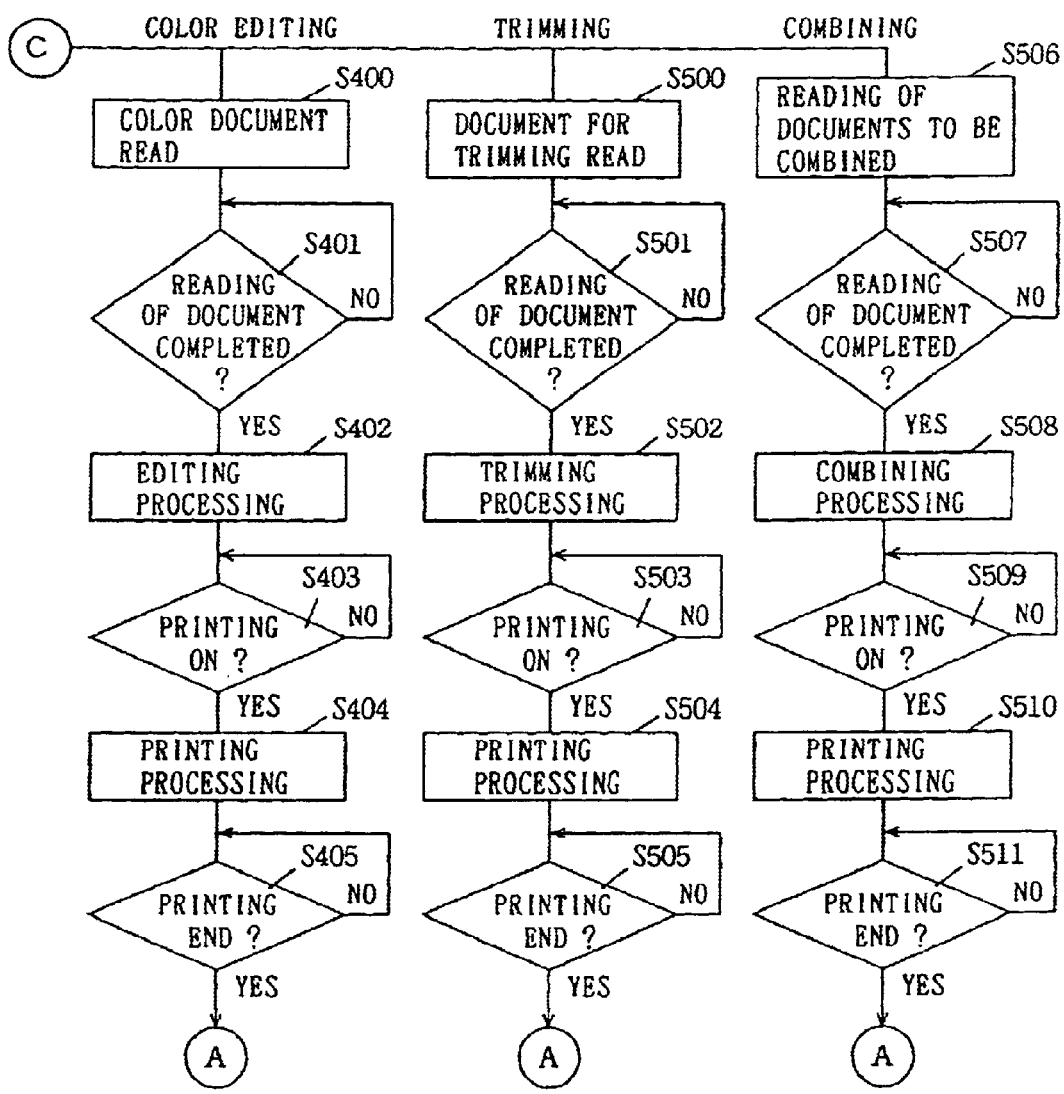
FIG. 54 is the continuation of the flow chart shown in FIG. 53.

Thus, a pattern in an area P3 designated by cursors S and E shown in FIG. 49 is for example registered, and a repeating pattern formed using the pattern is not different from the image of the original pattern as shown in FIG. 50.

As described above, in the copying machine according to this embodiment, the user can designate the position of a pattern to register by confirming the content displayed on the LCD, and therefore the user can accurately register a desired range to the device. In addition, the size of an area to be registered can be changed by the cursors, a pattern desired by the user can be registered to the device. Thus, the user can use a pattern not different from the image of the original as registered.

Referring to FIGS. 51 to 54, the processing by the copying machine shown in FIG. 1 will be briefly described. Note that the flow charts shown in FIGS. 51 to 54 are connected at positions A, B, C and D.

Referring to FIGS. 51 to 54, where the device is activated, in step S100, a menu image shown in FIG. 22 is displayed. In step S101, the user presses a desired position in the touch panel, and the operation is branched depending upon a selected mode.

If "registration" in FIG. 22 is selected, a registration menu shown in FIG. 35 is displayed in step S102. A registration mode (color palette editing, pattern editing, texture editing or marker editing setting) is selected in S103, and it is determined if a button is pressed in step S104.

Depending upon the selected registration mode, the processing is branched, and if the texture registration is selected (S105), the texture registration tool shown in FIG. 37 is displayed in step S106. The user selects a desired pattern in the texture palette (S106). Then, by pressing the start key, a document with a pattern is read in step S107. It is determined in step S108 whether the reading has been completed, and if the answer is YES, the entire read document is displayed in S109 at the read document window shown in FIG. 39.

In step S110, the user designates the central position of a pattern he/she wishes to register, and if the OK button is pressed (YES in S111), the document corresponding to the region designated is again read in step S112.

It is determined in step S113 whether the reading has been completed, if the answer is YES, the texture pattern is displayed enlarged at the enlargement display portion shown in FIG. 37 or 38 in step S114, and a repeated pattern is displayed at the repeating pattern display portion.

In step S115, the user designates the start and end positions of the pattern using cursors S and E. It is determined in step S116 if the OK button is pressed, and if the answer is YES, the texture is registered in step S117.

Note that the button pressed in step S104 is for "color palette editing, "pattern editing" or "marker editing setting", a corresponding processing is executed in step S120, S130 or S140.

If the coloring mode is selected in step S104, an image shown in FIG. 24 is displayed in step S200, and the reading key is pressed to read a document to be colored.

It is determined in step S201 whether the reading of the document has been completed, and if the answer is YES, an editing image shown in FIG. 25 is displayed in step S202, followed by the determination of whether the texture key within the coloring tool (the key on the right of the two keys positioned at the lowermost position of the coloring tool shown in FIG. 25) has been pressed.

If the answer is YES in step S202, the texture tool shown in FIG. 41 is displayed on the LCD in step S203.

It is determined in step S204 whether the texture. pattern select button is pressed, and if the answer is YES, a pattern displayed at the texture pattern preview is changed.

It is determined in step S206 whether a color palette color has been changed, and if the answer is YES, the color of the pattern is changed in S208.

If the print key is turned on, the texture pattern is output in step S209.

If the answer is NO in step S202, another editing processing such as area designation is conducted in step S220. It is determined in step S22 if the print key has been turned on, and if the key has been turned on, a printing processing is executed in step S222.

It is determined in step S223 whether the printing has been completed, and if the answer is YES, the processing from step S100 is repeated.

If the marker editing mode is selected in step S101, the image shown in FIG. 30 is displayed in step S300, and the document is read according to the content displayed. It is determined in step S301 whether the reading of the document has been completed, and if the answer is YES, the image shown in FIG. 31 is displayed in step S302. It is determined whether the texture key within the coloring tool has been turned on.

If the answer is YES in step S302, the texture tool shown in FIG. 41 is displayed in step S303. In step S304, it is determined whether the texture pattern select button has been turned on, and if the answer is YES, the texture pattern is changed and displayed at the texture pattern preview image in step S305.

It is determined if colors in the color palette have been changed in step S306, and if the answer is YES, the color of the pattern is changed in step S307.

If the print key has been turned on, the texture pattern is output in step S308, and the processing from steps S100 is repeated.

If the answer is NO in step S302, another editing processing such as adding an editing area is performed in step S320. It is determined in step S321 whether the print key has been turned on, and if the answer is YES, a printing processing is performed in step S322. It is determined in step S323 whether the printing processing has been completed, and if the answer is YES, the processing from step S100 is repeated.

If the color editing mode is selected in S101, the image shown in FIG. 33 is displayed in step S400, and a color document is read according to the content. It is determined in step S401 whether the reading of the document has been completed, and if the answer is YES, an edited image for the color document is displayed as shown in FIG. 34 in step S402, followed by editing processing.

It is determined in step S403 whether the print key has been turned on, and if the key has been turned on, a printing processing is performed in step S404. It is determined in step S405 whether the printing processing has been completed, and if the answer is YES, the processing from step S100 is repeated.

If the trimming is selected in step S101, a document for trimming is read in step S500, and it is determined in step S501 whether the reading has been completed. If the answer is YES in step S501, a trimming processing is performed in step S502 based on an input from the user.

It is determined in step S503 whether the print key has been turned on, and if the key has been turned on, a printing processing is performed in step S504. It is determined in step S505 whether the printing processing has been completed, and if the printing processing has been completed, the processing from S100 is performed.

If the combining is selected in step S101, documents to be combined are read in step S506, and whether the reading has been completed is determined in step S507. If the answer is YES in step S507, a combining processing is performed in step S508. It is determined in step S509 whether the print key has been turned on, and if the answer is YES, a printing processing is executed in step S510.

It is determined in step S511 whether the printing processing has been completed, and if the answer is YES, the processing from step S100 is performed.

As described above, in the copying machine according to this embodiment, the operator can confirm a result of editing on the LCD before output as a copy, and therefore copying errors can be reduced. Thus, the machine will be more easily handled.

In addition, data which has been subjected to closing processing can be used for detecting a closed loop, the precision of detecting of closed loops improves. For LCD display, an image as read without closing processing can be displayed, which is easier for the operator to view on the LCD.

Furthermore, depending upon the reading mode (black-and-white document/color document), the way of using the memory planes in the LCD display memory can be changed, a read document with the most preferable texture quality depending upon the image to read can be displayed.

Furthermore, the user can register a pattern at a desired position to the machine by confirming the displayed pattern, the user can accurately register the position he/she desires accurately into the machine.

In addition, since the size of a pattern to register can be changed, a plurality of such registered patterns are arranged side by side for display. A pattern desired by the user can be obtained. A texture having the image faithful to the originally read pattern can be accurately reproduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image editing apparatus, comprising:

means for obtaining image data;

means for displaying said obtained image data;

means for designating a part of said displayed image data;

means for registering said designated part of the image data as pattern data for use in editing an image; and means for reading the registered pattern data and outputting a repeating pattern in which said pattern data is repeatedly arranged in both vertical and horizontal directions.

2. The image editing apparatus as recited in claim 1, wherein said designating means includes setting means capable of arbitrarily setting the size of said part.

3. The image editing apparatus as recited in claim 2, further comprising second display means for displaying said designated part of image data in an enlarged form.

4. The image editing apparatus as recited in claim 1, further comprising second display means for displaying said designated part of image data in an enlarged form.

5. The image editing apparatus as recited in claim 1, further comprising a correcting means for correcting a range of the image data to be registered as a pattern.

6. A method of editing an image, comprising the steps of:

obtaining image data;

displaying said obtained image data;

designating a part of said displayed image data;

registering said designated part of the image data as pattern data for use in editing an image; and reading the registered pattern data and outputting a repeating pattern in which said pattern data is repeatedly arranged in both vertical and horizontal directions.

7. The image editing method as recited in claim 6, wherein said designated part of image data is displayed in an enlarged form.

8. The image editing method as recited in claim 6, further comprising the step of correcting a range of the image data to be registered as a pattern.

9. The image editing method as recited in claim 6, wherein said designation step includes a setting step of arbitrarily setting the size of said part.

10. The image editing method as recited in claim 9, wherein said designated part of image data is displayed in an enlarged form.

11. An image editing apparatus, comprising:
means for obtaining image data;
means for displaying said obtained image data;
means for designating a point in said displayed image data;
means for registering the image data including said designated point as pattern data for use in editing an image; and
means for reading the registered pattern data and outputting a repeating pattern in which said pattern data is repeatedly arranged in both vertical and horizontal directions.

12. The image editing apparatus as recited in claim 11, wherein said registering means registers a region of the image data in a specified range around said designated point as pattern data.

13. The image editing apparatus as recited in claim 12, further comprising second display means for displaying the image data including said designated point in an enlarged form.

14. The image editing apparatus as recited in claim 11, further comprising second display means for displaying the image data including said designated point in an enlarged form.

15. The image editing apparatus as recited in claim 11, further comprising a correcting means for correcting a range of the image data to be registered as a pattern.

16. A method of editing an image, comprising the steps of:
obtaining image data;
displaying said obtained image data;
designating a point in said displayed image data;
registering the image data including said designated point as pattern data for use in editing an image; and
reading the registered pattern data and outputting a repeating pattern in which said pattern data is repeatedly arranged in both vertical and horizontal directions.

17. The image editing method as recited claim 16, wherein
said registering step includes registering a region of the image in a specified range around said designated point as pattern data.

18. The image editing method as recited in claim 17, further comprising a second display step of displaying the image data including said designated point in an enlarged form.

19. The image editing method an image as recited in claim 16, further comprising a second display step of displaying the image data including said designated point in an enlarged form.

20. The image editing method as recited in claim 16, further comprising the step of correcting a range of the image data to be registered as a pattern.

21. An image editing apparatus, comprising:
an obtain portion for obtaining image data;
a display portion for displaying said obtained image data;
a designate portion for designating a part of said displayed image data;
a repeating pattern display portion displaying a plurality of designated patterns repeatedly arranged in both vertical and horizontal directions, to show actual image of the pattern repeatedly arranged in both vertical and horizontal directions; and
a register portion for registering said designated part of the image data as pattern data for use in editing an image.

22. An image editing apparatus, comprising the steps of:
obtaining image data;
displaying said obtained image data;
designating a part of said displayed image data;
displaying a plurality of designated patterns repeatedly arranged in both vertical and horizontal directions, to show actual image of the pattern repeatedly arranged in both vertical and horizontal directions; and
registering said designated part of the image data as pattern data for use in editing an image.

23. An image editing apparatus, comprising:
an obtain portion for obtaining image data;
a display portion for displaying said obtained image data;
a designate portion for designating a point in said displayed image data;
a repeating pattern display portion displaying a plurality of designated patterns repeatedly arranged in both vertical and horizontal directions, to show actual image of the pattern repeatedly arranged in both vertical and horizontal directions; and
a register portion for registering the image data including said designated point as pattern data for use in editing an image.

24. A method of editing an image, comprising the steps of:
obtaining image data;
displaying said obtained image data;
designating a point in said displayed image data;
displaying a plurality of designated patterns repeatedly arranged in both vertical and horizontal directions, to show actual image of the pattern repeatedly arranged in both vertical and horizontal directions; and
registering the image data including said designated point as pattern data for use in editing an image.

25. An image editing apparatus, comprising:
an image data obtaining device configured to obtain image data;
a display device configured to display said obtained image data;
a designating device configured to designate a part of said displayed image data;
a registering device configured to register said designated part of the image data as pattern data for use in editing an image; and
a reading device configured to read the registered pattern data and outputting a repeating pattern in which said pattern data is repeatedly arranged in both vertical and horizontal directions.

26. The image editing apparatus as recited in claim 25, wherein
said designating device includes a setting device configured to arbitrarily setting the size of said part.

27. The image editing apparatus as recited in claim 26, further comprising a second display device configured to display said designated part of image data in an enlarged form.

28. The image editing apparatus as recited in claim 25, further comprising a second display device configured to display said designated part of image data in an enlarged form.

29. The image editing apparatus as recited in claim 25, further comprising a correcting device configured to correct a range of the image data to be registered as a pattern.

30. An image editing apparatus, comprising:

an image data obtaining device configured to obtain image data;

a display device configured to display said obtained image data;

a designating device configured to designate a point in said displayed image data;

a registering device registering the image data including said designated point as pattern data for use in editing an image; and a reading device configured to read the registered pattern data and outputting a repeating pattern in which said pattern data is repeatedly arranged in both vertical and horizontal directions.

31. The image editing apparatus as recited in claim 30, wherein said registering device is configured to register a region of the image data in a specified range around said designated point as pattern data.

32. The image editing apparatus as recited in claim 31, further comprising a second display device configured to display the image data including said designated point in an enlarged form.

33. The image editing apparatus as recited in claim 30, further comprising a second display device configured to display the image data including said designated point in an enlarged form.

34. The image editing apparatus as recited in claim 30, further comprising a correcting device configured to correct a range of an image to be registered as a pattern.

* * * * *